United States Patent
Kim et al.

(10) Patent No.: US 10,499,275 B2
(45) Date of Patent: Dec. 3, 2019

(54) METHOD AND DEVICE FOR REPORTING BUFFER STATE DURING LTE-WIRELESS LAN COMBINING IN WIRELESS COMMUNICATION SYSTEM

(71) Applicant: Samsung Electronics Co., Ltd., Suwon-si, Gyeonggi-do (KR)

(72) Inventors: Sangbum Kim, Suwon-si (KR); Jaehyuk Jang, Suwon-si (KR); Gert Jan Van Lieshout, Apeldoorn (NL); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/576,085
(22) PCT Filed: May 23, 2016
(86) PCT No.: PCT/KR2016/005448
§ 371 (c)(1),
(2) Date: Nov. 21, 2017
(87) PCT Pub. No.: WO2016/190639
PCT Pub. Date: Dec. 1, 2016

(65) Prior Publication Data
US 2018/0213435 A1 Jul. 26, 2018

Related U.S. Application Data

(60) Provisional application No. 62/165,470, filed on May 22, 2015.

(51) Int. Cl.
| | | |
|---|---|---|
| *H04W 4/00* | (2018.01) | |
| *H04W 28/02* | (2009.01) | |
| *H04W 36/00* | (2009.01) | |
| *H04W 48/02* | (2009.01) | |
| *H04W 48/08* | (2009.01) | |
| *H04W 76/10* | (2018.01) | |
| *H04L 12/859* | (2013.01) | |
| *H04W 48/04* | (2009.01) | |

(Continued)

(52) U.S. Cl.
CPC ..... *H04W 28/0278* (2013.01); *H04L 47/2475* (2013.01); *H04W 36/00* (2013.01);
(Continued)

(58) Field of Classification Search
CPC .................................................. H04L 47/2475
See application file for complete search history.

(56) References Cited

U.S. PATENT DOCUMENTS

| 9,332,968 | B2 | 5/2016 | Skakoon | |
|---|---|---|---|---|
| 2013/0040597 | A1* | 2/2013 | Jang | H04W 4/70 455/404.1 |

(Continued)

FOREIGN PATENT DOCUMENTS

| WO | 2014/160611 A1 | 10/2014 |
|---|---|---|
| WO | 2015/031202 A1 | 3/2015 |

OTHER PUBLICATIONS

3GPP Draft; R2-152391 ACDC Impacts on RAN, 3rd Generation Partnership Project (3GPP), Mobile Competence Centre ; 650, Route Des Lucioles ; F-06921 Sophia-Antipolis Cedex ; France, vol. RAN WG2, no. Fukuoka, Japan; May 25, 2015-May 29, 2015 May 16, 2015 (May 16, 2015), XP050971041 (Year: 2015).*

(Continued)

*Primary Examiner* — Chi H Pham
*Assistant Examiner* — Fahmida S Chowdhury
(74) *Attorney, Agent, or Firm* — Jefferson IP Law, LLP

(57) ABSTRACT

Disclosed are methods and systems for merging, with IoT technology, a 5G communication system for supporting a data transmission rate higher than that of a 4G system. The disclosed methods and systems can be applied to intelligent services on the basis of 5G communication technology and IoT-related technology. More specifically, a communication method of a terminal in a mobile communication system comprises: receiving, from a base station, system informa-
(Continued)

tion including application specific congestion control for data communication (ACDC) configuration information for indicating whether to apply ACDC to a terminal belonging to a home public land mobile network (HPLMN); determining whether to permit access to the base station on the basis of parameters relating to the ACDC, when the application of the ACDC to the terminal belonging to the HPLMN is set according to the ACDC configuration information; and communicating with the base station according to the determination result.

11 Claims, 27 Drawing Sheets

(51) Int. Cl.
   *H04W 48/14* (2009.01)
   *H04W 48/06* (2009.01)
   *H04W 84/04* (2009.01)
   *H04W 48/12* (2009.01)

(52) U.S. Cl.
   CPC .......... *H04W 48/02* (2013.01); *H04W 48/04* (2013.01); *H04W 48/08* (2013.01); *H04W 48/14* (2013.01); *H04W 76/10* (2018.02); *H04W 28/0289* (2013.01); *H04W 48/06* (2013.01); *H04W 48/12* (2013.01); *H04W 84/045* (2013.01)

(56) References Cited

U.S. PATENT DOCUMENTS

| | | | | |
|---|---|---|---|---|
| 2015/0271708 A1* | 9/2015 | Zaus | .................... | H04W 76/18 370/230 |
| 2015/0289195 A1* | 10/2015 | Gogic | .................. | H04W 48/06 370/230 |
| 2016/0353356 A1* | 12/2016 | Payyappilly | .......... | H04W 48/06 |

OTHER PUBLICATIONS

Intel Corporation, Considerations on RAN2 impacts to support ACDC requirements, 3GPP TSG-RAN WG2 Meeting #90, R2-152151, Fukuoka, Japan, May 16, 2015.
3GPP; TSG SA; Study on Application-Specific Congestion Control for Data Communication (Release 13), 3GPP TR 22.806 V13.1.0, Sep. 26, 2014.
China Telecom, Controlling ongoing service when ACDC activated, 3GPP TSG-SA WG1 Meeting #63, S1-134011, Zagreb, Croatia, Aug. 9, 2013.
Nokia Networks; "ACDC impacts on RAN"; 3GPP Draft R2-152391; 3GPP, Mobile Competence Centre, 650, Route Des Lucioles; F-06921 Sophia-Antipolis Cedex; France; 3GPP TSG-RAN WG2 Meeting #90 Fukuoka, Japan, May 25-29, 2015.
NEC; "RAN2 work on ACDC"; 3GPP Draft R2-152527; 3GPP, Mobile Competence Centre, 650, Route Des Lucioles; F-06921 Sophia-Antipolis Cedex; France; 3GPP TSG RAN2 Meeting #90 Fukuoka, Japan, May 25-29, 2015.
Huawei, HiSilicon; "Discussion on RAN impacts due to ACDC"; 3GPP Draft R2-152289; 3GPP, Mobile Competence Centre, 650, Route Des Lucioles; F-06921 Sophia-Antipolis Cedex; France; 3GPP TSG-RAN WG2 Meeting #90 Fukuoka, Japan, May 25-29, 2015.
LG Electronics; "ACDC impacts on AS layer"; 3GPP Draft R2-152304; 3GPP, Mobile Competence Centre, 650, Route Des Lucioles; F-06921 Sophia-Antipolis Cedex; France; 3GPP TSG-RAN WG2 #90 Fukuoka, Japan, May 25-29, 2015.
LG Electronics; "Considerations on NAS and RRC impacts for ACDC mechanism"; 3GPP Draft C1-151249; 3GPP, Mobile Competence Centre, 650, Route Des Lucioles; F-06921 Sophia-Antipolis Cedex; France; 3GPP TSG CT WG1 Meeting #91 Bratislava (Slovakia), Apr. 13-17, 2015.

\* cited by examiner

METHOD AND DEVICE FOR REPORTING BUFFER STATE DURING LTE-WIRELESS LAN COMBINING IN WIRELESS COMMUNICATION SYSTEM

TECHNICAL FIELD

The present invention relates to a wireless communication system and, in particular, to multi-connectivity in the wireless communication system.

BACKGROUND ART

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M) communication, and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, Machine to Machine (M2M) communication, and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

As described above, many discussions are underway for improving communication techniques in various fields to meet the growing demand of mobile data traffic. D2D communication, carrier aggregation for use of multiple cells, and large-scale antenna-based multi-antenna systems are representative examples.

DISCLOSURE OF INVENTION

Technical Problem

The present invention has been conceived to achieve the above-described object and aims to provide a device and method for supporting multi-connectivity across different radio access technologies in a wireless communication system.

Also, the present invention aims to provide a method and apparatus for applying ACDC information transmitted by a network effectively to a terminal in a wireless communication system.

Solution to Problem

In accordance with an aspect of the present invention, a communication method of a terminal in a wireless communication system includes receiving system information including application specific congestion control for data communication (ACDC) configuration information indicating whether ACDC is applied to the terminal belonging to a home public land mobile network (HPLMN), the system information being broadcast by a base station; determining, when the ACDC configuration information indicates that the ACDC is applied to the terminal belonging to the HPLMN, whether the terminal is allowed to gain access to the base station based on an ACDC parameter; and communicating with the base station according to a determination result.

In accordance with another aspect of the present invention, a communication method of a base station in a wireless communication system includes generating application specific congestion control for data communication (ACDC) configuration information indicating whether ACDC is applied to a terminal belonging to a home public land mobile network (HPLMN) and broadcasting system information including the ACDC configuration information for the terminal, wherein the terminal determines, when the ACDC configuration information indicates that the ACDC is applied to the terminal belonging to the HPLMN, whether the terminal is allowed to gain access to the base station based on an ACDC parameter.

In accordance with another aspect of the present invention, a terminal in a mobile communication system includes a transceiver which transmits and receives signals and a controller which controls the transceiver to receive system information including application specific congestion control for data communication (ACDC) configuration information indicating whether ACDC is applied to the terminal belonging to a home public land mobile network (HPLMN), the system information being broadcast by a base station; determines, when the ACDC configuration information indicates that the ACDC is applied to the terminal belonging to the HPLMN, whether the terminal is allowed to gain access to the base station based on an ACDC parameter; and controls communication with the base station according to a determination result.

In accordance with still another aspect of the present invention, a base station in a mobile communication system includes a transceiver which transmits and receives signals and a controller which controls generating application specific congestion control for data communication (ACDC) configuration information indicating whether ACDC is applied to a terminal belonging to a home public land mobile network (HPLMN) and broadcasting system information including the ACDC configuration information for the terminal, wherein the terminal determines, when the ACDC configuration information indicates that the ACDC is applied to the terminal belonging to the HPLMN, whether the terminal is allowed to gain access to the base station based on an ACDC parameter.

Advantageous Effects of Invention

The methods and devices of the present invention are advantageous in terms of facilitating large volume and high-speed communication service through multi-connectivity across different radio access technologies in a wireless communication system.

Also, the methods and devices of the present invention are advantageous in terms of facilitating large volume and high-speed communication service by maintaining multi-connectivity across different radio access technologies even during a handover.

Also, the methods and devices of the present invention are advantageous in terms of applying ACDC information transmitted by a network to a terminal effectively in a wireless communication system.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Descriptions are made of the techniques for providing multi-connectivity in a wireless communication system according to the present invention.

In the following description, the terms indicating various access nodes, network entities, messages, interfaces between network entities, and information items are used for convenience of explanation of the present invention. Accordingly, the terms used in the following description are not limited to specific meanings and may be replaced by other terms that are equivalent in technical meanings.

In the following descriptions, the terms and definitions given in the 3rd generation partnership project long term evolution (3GPP LTE) and Institute of Electrical and Electronical Engineers (IEEE) 802.11 standards are used for convenience of explanation.

However, the present invention is not limited by use of these terms and definitions and other arbitrary terms and definitions may be employed instead.

A description is made of multi-connectivity with a wireless local area network (WLAN) technology in a cellular communication system according to embodiments of the present invention. However, another radio access technology (RAT) may be applied instead of the WLAN technology.

<First Embodiment>

Figure 1:
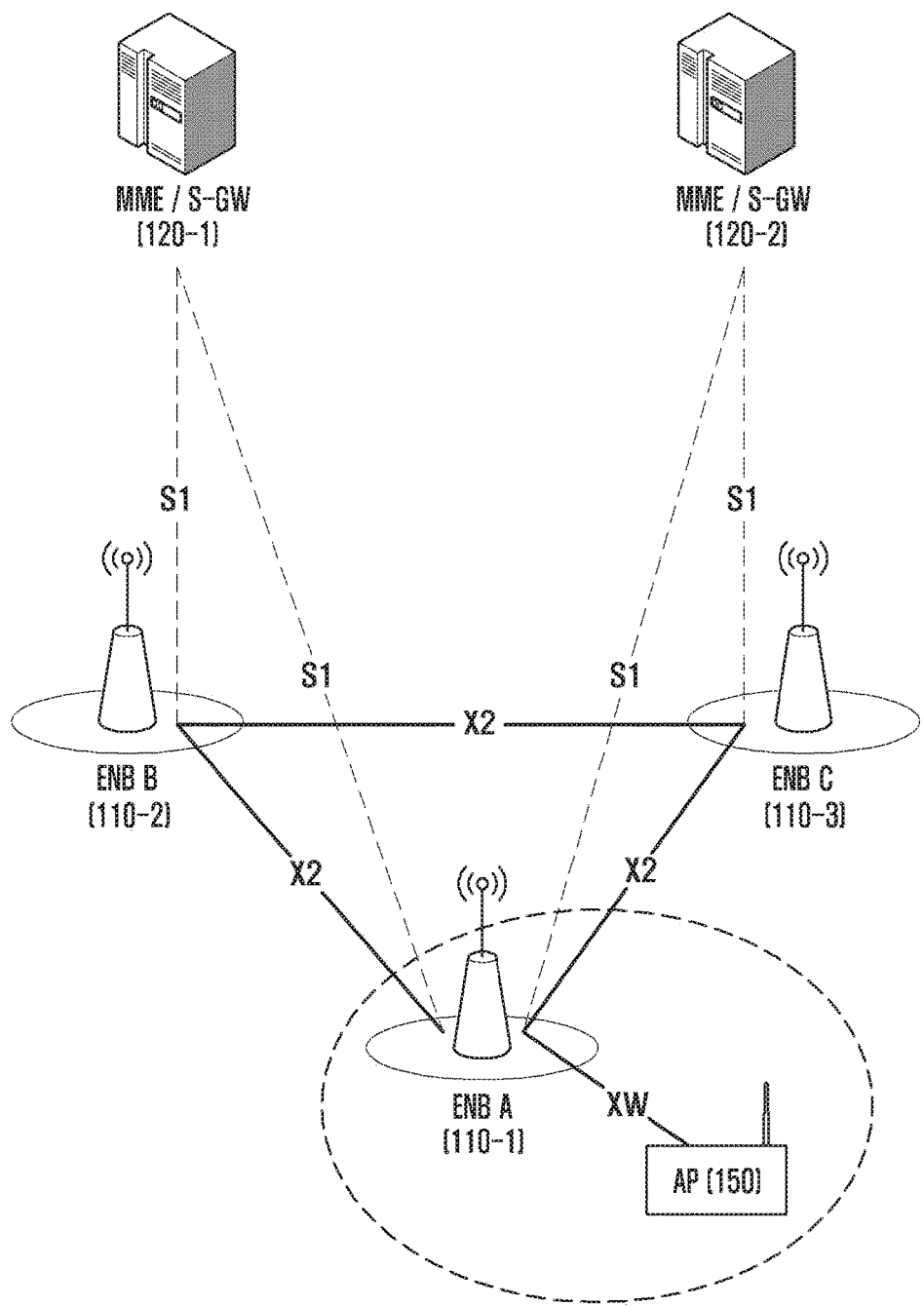
FIG. 1 is a diagram illustrating network architecture of a wireless communication system according to an embodiment of the present invention.

FIG. 1 is a diagram illustrating network architecture of a wireless communication system according to an embodiment of the present invention.

In reference to FIG. 1, the wireless communication system includes an eNB A 110-1, an eNB B 110-2, an eNB C 110-3, mobility management entity/serving gateways (MME/S-GWs) 120-1 and 120-2, and an access point (AP) 150. Although three eNBs are depicted in the drawing, the number of eNBs may be decreased to 2 or increased to 4 or more. Each of the MME/S-GWs 120-1 and 120-2 may be divided into an MME and an S-GW.

The eNBs 110-1, 110-2, and 110-3 are access nodes of the cellular network and provide radio connectivity to the UEs. That is, the eNBs 110-1, 110-2, and 110-3 provide links between the UE and the core network. According to various embodiments of the present invention, the eNB A 110-1 is capable of providing multi-connectivity to the UE using the AP 150.

The MME/S-GWs 120-1 and 120-2 manage mobility of the UEs. The MME/S-GWs 120-1 and 120-2 may also take charge of authentication and bearers of the UEs connected to the network. The MME/S-GWs 120-1 and 120-2 may process the packets that arrive from the eNB 220 and are to be forwarded to the eNBs 110-1, 110-2, and 110-3.

The AP 150 is an access node of the WLAN and provides radio connectivity to the UEs. According to various embodiments of the present invention, the AP 150 may provide WLAN-based multi-connectivity to the UE under the control of the eNB A 110-1. According to an embodiment of the present invention, the AP 150 may be integrated in the eNB A 110-1 or connected to the eNB A 110-1 through a separate interface. In this case, the eNB A 110-1 may transmit part of the data destined for the UE directly and the residual part of the data via the AP 150. The UE may transmit part of uplink data to the eNB A 110-1 and the remaining part of the uplink data via the AP 150.

The UE may connect to the cellular network via the eNB A 110-1. According to an embodiment of the present invention, the eNB A 110-1 may configure a connection of the UE to the AP 150 such that the UE communicates in a broader band. At this time, the service can be provided, even though a core network entity (e.g., MME, S-GW, and Packet Data Network Gateway (P-GW)) is not aware of the multi-connectivity configured in association with the AP 150. The multi-connectivity is called LTE-WLAN aggregation (integration or carrier aggregation (CA)).

In the case of implementing the multi-connectivity via the AP 150, it is necessary to determine a link for transmitting data. In downlink, the eNB A 110-1 may determine to deliver the data received from the core network to a UE directly or via the WLAN. In uplink, a UE may determine a data link to transmit data to the core network.

Figure 2:
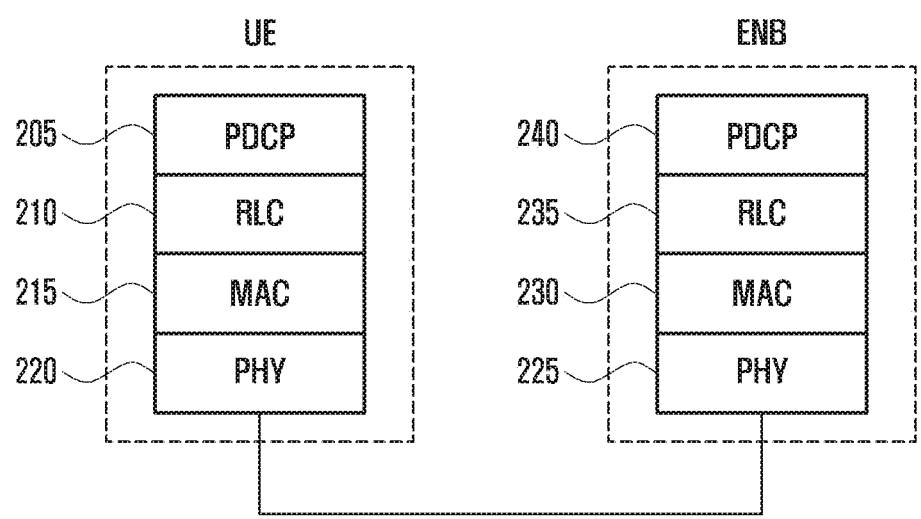
FIG. 2 is a diagram illustrating a radio protocol stack of an LTE system to which the present invention is applied.

FIG. 2 is a diagram illustrating a radio protocol stack of an LTE system to which the present invention is applied.

In reference to FIG. 2, the protocol stack of the interface between the UE and the eNB in the LTE system includes a plurality of protocol layers stacked from the bottom to the top: physical layer denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240. The PDCP layer denoted by reference numbers 205 and 240 takes charge of compressing/decompressing an IP header, and the RLC layer denoted by reference numbers 210 and 235 takes charge of segmenting a PDCP Packet Data Unit (PDU) into segments of appropriate size. The MAC layer denoted by reference numbers 215 and 230 allows for connection of multiple RLC entities established for one UE and takes charge of multiplexing RLC PDUs from the RLC layer into an MAC PDU and demultiplexing an MAC PDU into RLC PDUs. The PHY layer denoted by reference numbers 220 and 225 takes charge of channel-coding and modulation on higher layer data to generate and transmit OFDM symbols over a radio channel and demodulating and channel-decoding on OFDM symbols received over the radio channel to deliver the decoded data to the higher layers. Also, the PHY layer uses hybrid ARQ (HARQ) for additional error correction by transmitting 1-bit information indicating for positive or negative acknowledgement from the receiver to the transmitter. This is referred to as HARQ ACK/NACK information. The downlink HARQ ACK/NACK corresponding to the uplink transmission is carried by physical hybrid-ARQ indicator channel (PHICH), and the uplink HARQ ACK/NACK corresponding to downlink transmission is carried by physical uplink control channel (PUCCH) or physical uplink shared channel (PUSCH).

Figure 3:
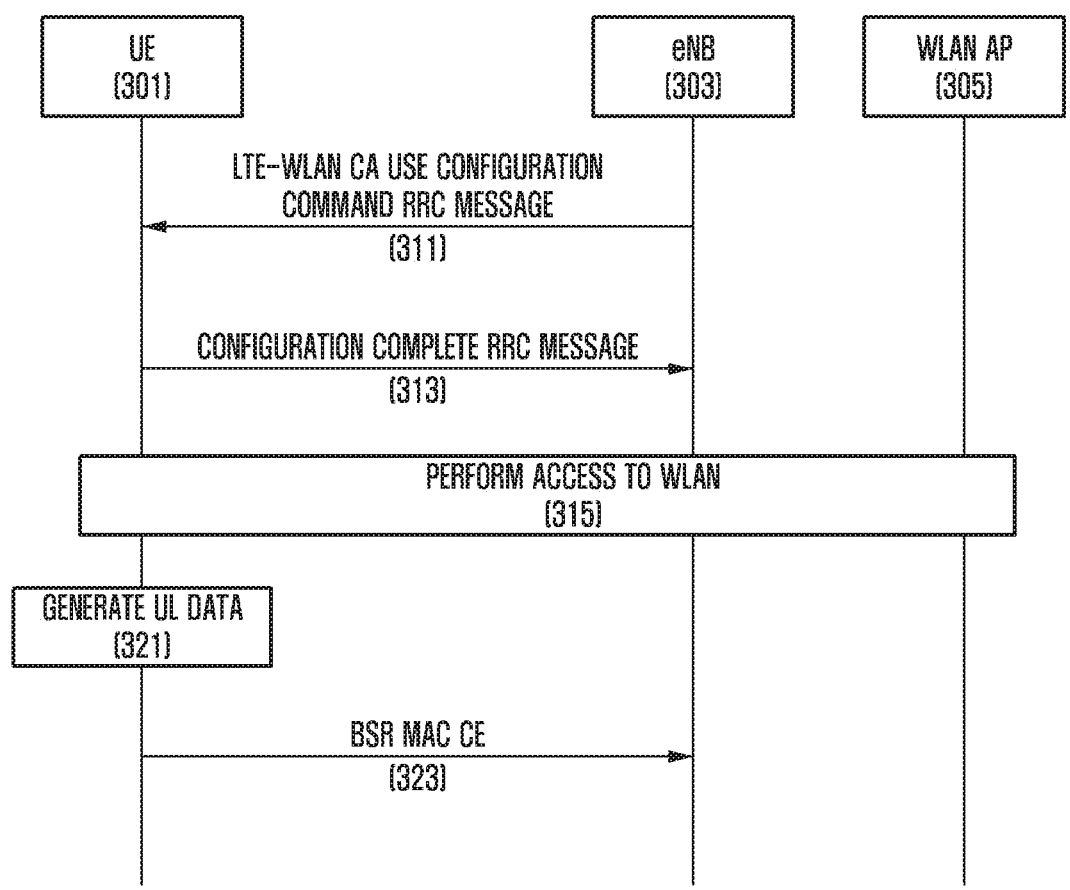
FIG. 3 is a signal flow diagram illustrating a buffer status report method of a UE according to an embodiment of the present invention.

FIG. 3 is a signal flow diagram illustrating a buffer status report method of a UE according to an embodiment of the present invention.

An LTE UE 301 connected to an LTE eNB 303 receives a message instructing to configure a WLAN cell additionally from the eNB 303 at step 311. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message includes identity information of a target WLAN AP and information on bearers permitted for use via the corresponding WLAN. For example, an important message concerning the control of the UE may be configured so as to be transmitted via the LTE eNB for service stability.

Upon receipt of this message, the UE transmits an RRC layer message for acknowledging successful receipt of the message at 313. This RRC layer message may be the RRCConnectionReconfigurationComplete message. Next, the UE attempts access to the WLAN AP with the target WLAN AP identifier at step 315. Alternatively, the UE may make the attempt to access the WLAN AP before transmitting the RRCConnectionReconfigurationComplete message.

If new data to be transmitted to the eNB is generated at step 321 after the connection to the WLAN, the UE transmits a message for reporting its buffer status to the eNB at step 323. This message is conveyed by a buffer status report (BSR) MAC CE which is one of MAC control elements (CEs) as MAC layer control messages. The BSR MAC CE is used for the UE to report the status of the buffer storing the data to be transmitted in uplink, and the BSR is categorized as follows according to the BSR trigger condition.

Type 1: Regular BSR
  BSR being transmitted upon expiry of BSR retransmission timer (retxBSRTimer) when there is any data to be transmitted through a logical channel/radio bearer (RB) belonging to a logical channel group (LCG)
  BSR being transmitted when data to be transmitted is generated from a higher layer (RLC or PDCP layer) for a logical channel/radio bearer belonging to the LCG and has a priority higher than that of the logical channel/radio bearer belonging to any other LCG.
  BSR being transmitted when data to be transmitted is generated from a higher layer (RLC or PDCP layer) for a logical channel/radio bearer belonging to the LCG and no data to be transmitted exists in any other LCG.
Type 2: Periodic BSR
  BSR being transmitted when a periodic BSR timer (periodicBSR-Timer) of the UE expires.
Type 3: Padding BSR
  BSR being transmitted when uplink resources are allocated and the number of padding bits filled in the space remaining after arranging data to be transmitted is equal to or greater than the sum of the sizes of BSR MAC CE and sub-header of the BSR MAC CE
  If multiple LCG buffers have packets, a truncated BSR is transmitted.

If a BSR is received, the eNB checks the buffer status of the UE to allocate uplink resources to the UE.

Figure 4A:
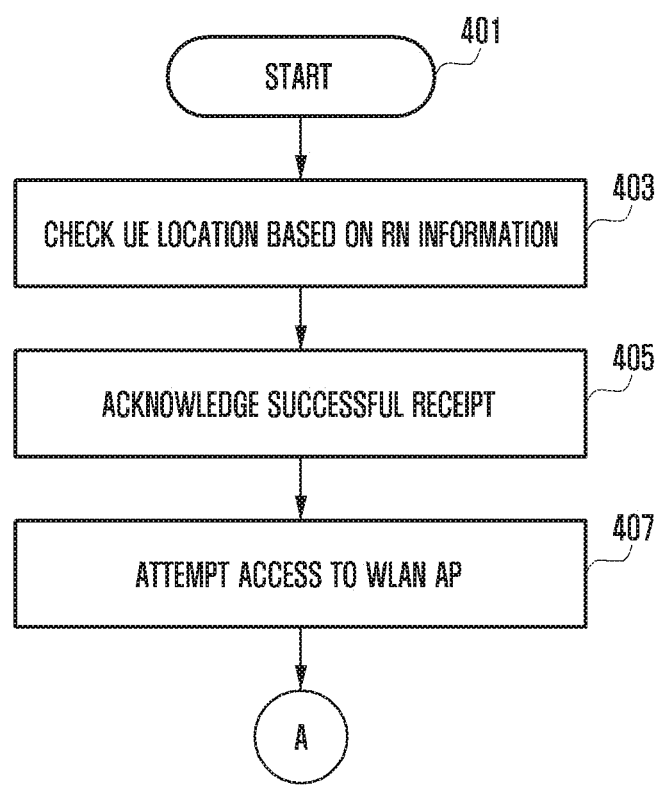
FIGS. 4A and 4B are a diagram illustrating a UE operation for reporting its buffer status according to an embodiment of the present invention.
Figure 4B:
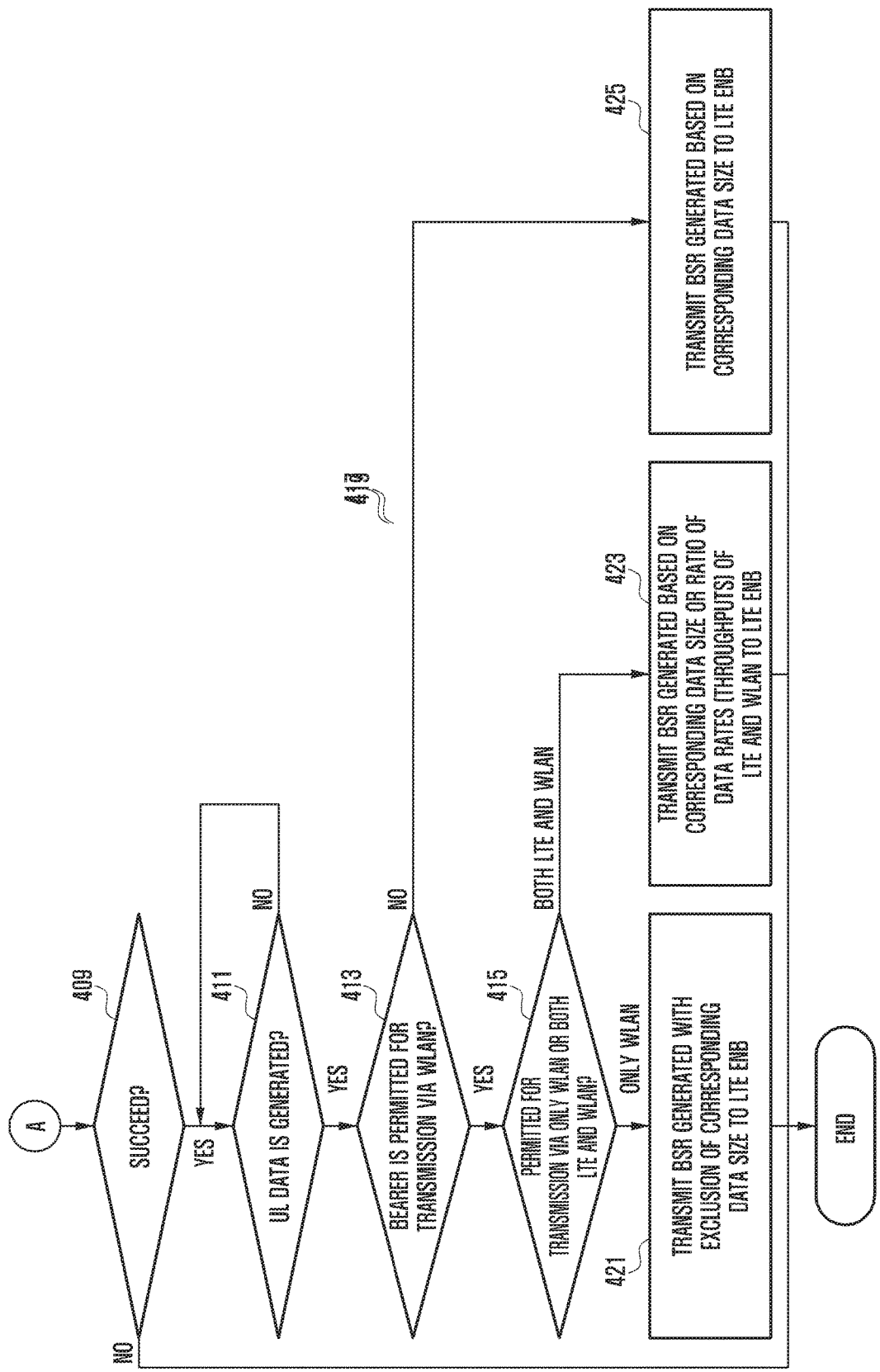

FIGS. 4A and 4B are a diagram illustrating a UE operation for reporting a buffer status of a UE according to an embodiment of the present invention.

In reference to FIG. 4A, the UE receives a message for configuring a WLAN cell from an LTE eNB at step 403. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message includes identity information of a target WLAN AP and optional information on bearers available for the corresponding WLAN.

Upon receipt of this message, the UE transmits an RRC layer message for acknowledging successful receipt of the message at step 405. This RRC layer message may be the RRCConnectionReconfigurationComplete message. Next, the UE attempts access to the WLAN AP with the target WLAN AP identifier at step 407. Alternatively, the UE may make the attempt to access the WLAN AP before transmitting the RRCConnectionReconfigurationComplete message.

In reference to FIG. 4B, if new data to be transmitted to the eNB is generated at step 411 after the connection to the WLAN AP, the UE determines at step 413 whether the bearer to which the generated data packet belongs is permitted for transmission via WLAN. If the corresponding bearer is not permitted for transmission via WLAN, the UE generates a BSR MAC CE according to the size of the corresponding data and transmits the BSR MAC CE to the LTE eNB at step 425.

If the corresponding bearer is permitted for transmission via WLAN, the UE determines at step 415 whether the bearer is permitted for transmission via both the LTE and WLAN.

If the corresponding bearer is permitted for transmission via the WLAN only, the UE generates a BSR MAC CE excluding the size of the generated packet and reports the buffer status to the LTE eNB at step 421. This aims to prevent the LTE eNB from allocating unnecessary uplink resources.

If the corresponding bearer is permitted for transmission via both the LTE and WLAN, the UE generates a BSR MAC CE according to the size of the generated data and transmits the BSR MAC CE to the LTE eNB at step 423 as at step 425. In this case, if the packet generated by the UE is transmitted to the WLAN AP, the uplink resources allocated by the eNB may not be used. In an embodiment of the present invention, if the bearer is permitted for transmission via both the LTE and WLAN, the UE may determine the ratio between the data rates (throughputs) of the LTE and WLAN and generate at step 423 a BSR according to the size determined based on the ratio of the data rate of LTE to that of WLAN, the BSR being transmitted to the LTE eNB. In this way, it may be possible to improve utilization efficiency of LTE uplink resources allocated by the eNB.

Figure 5:
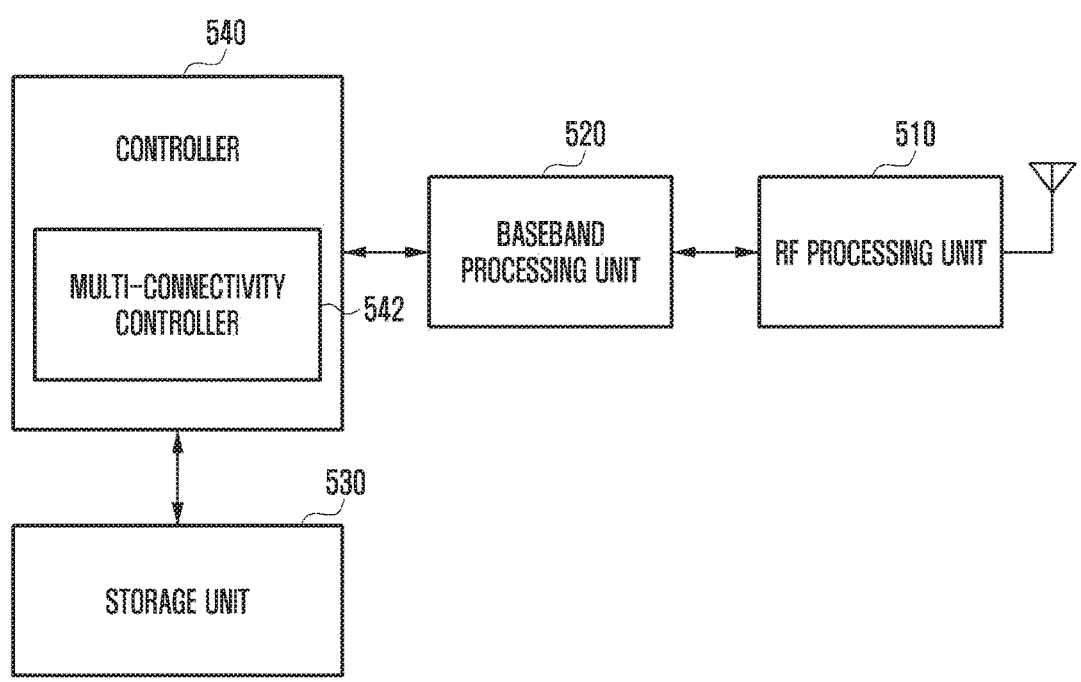
FIG. 5 is a block diagram illustrating a UE in a wireless communication system according to an embodiment of the present invention.

FIG. 5 is a block diagram illustrating a UE in a wireless communication system according to an embodiment of the present invention.

In reference to FIG. 5, the UE includes a radio frequency (RF) processing unit 510, a baseband processing unit 520, a storage unit 530, and a controller 540.

The RF processing unit 510 takes charge of signal band conversion and amplification for transmitting signals over a radio channel. That is, the RF processing unit 510 up-converts a baseband signal output from the baseband processing unit 520 to an RF band signal for transmission through antennas and down-converts an RF band signal received through the antenna to a baseband signal. For example, the RF processing unit 510 may include a transmission filter, a reception filter, an amplifier, a mixer, an oscillator, a digital-to-analog converter (DAC), and an analog-to-digital convertor (ADC). Although one antenna is depicted in FIG. 5, the terminal may include a plurality of antennas. The RF processing unit 510 may include a plurality of RF chains. The RF processing unit 510 may perform beamforming. For beamforming, the RF processing unit 510 may adjust the phases and sizes of the signal transmitted/received through the antennas or antenna elements.

The baseband processing 520 takes charge of conversion between baseband signals and bit strings according to a physical layer protocol of the system. For example, the baseband processing unit 520 performs encoding and modulation on the transmit bit strings to generate complex symbols in data transmission mode. The baseband processing unit 520 also performs demodulation and decoding on the baseband signal from the RF processing unit 510 to recover the received bit strings in data reception mode. For the case of an orthogonal frequency division multiplexing (OFDM) system, the baseband processing unit 520 performs encoding and modulation on the transmit bit string to generate complex symbols, maps the complex symbols to subcarriers, performs inverse fast Fourier transform (IFFT) on the subcarriers, and inserts a cyclic prefix (CP) to generate OFDM symbols in the data transmit mode. The baseband processing unit 520 splits the baseband signal from the RF processing unit 510 into OFDM symbols, recovers the signals mapped to the subcarriers through fast Fourier transform (FFT), and performs demodulation and decoding to recover the bit strings in the data reception mode.

The baseband processing unit 520 and the RF processing unit 510 take charge of transmitting and receiving signals as described above. Accordingly, the baseband processing unit 520 and the RF processing unit 510 may be referred to as a transmission unit, a reception unit, a transceiver, or a communication unit. At least one of the baseband processing unit 520 and the RF processing unit 510 may include a plurality of communication modules for supporting different radio access technologies. At least one of the baseband processing unit 520 and the RF processing unit 510 may include a plurality of communication modules for processing different frequency bands signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz).

The storage unit 530 stores basic programs for operation of the terminal, application programs, and data such as configuration information. In particular, the storage unit 530 may store the information related to the secondary access node with which the terminal performs radio communication using the secondary radio access technology.

The storage unit 530 provides the stored data in response to a request from the controller 540.

The controller 540 controls overall operations of the terminal. For example, the controller 540 controls the baseband processing unit 520 and the RF processing unit 510 to transmit/receive signals. The controller 540 also writes and reads data to and from the storage unit 540. In order to accomplish this, the controller 540 may include at least one processor. For example, the controller 540 may include a communication processor (CP) for controlling communication and an application processor (AP) for controlling higher layers such as application programs.

According to an embodiment of the present invention, the controller 540 includes a multi-connectivity processing unit 542. For example, the controller 540 may control the UE to perform the UE operations and procedures described with reference to FIG. 2. The controller 540 operates as follows according to an embodiment of the present invention.

According to an embodiment of the present invention, if uplink data transfer happens, the controller 540 transmits a BSR MAC CE to a primary access node taking charge of radio communication using a primary radio access technology in order for the primary access node to allocate uplink resources.

The methods specified in the claims and specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the present invention.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or all of the aforementioned media. The storage unit may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present invention by means of an external port. It may also be possible for a separate storage device installed on a communication network to attach to the device performing the methods according to embodiments of the present invention.

In the embodiments of the present inventions, the components are described in singular or plural forms depending on the embodiment. However, the singular and plural forms are selected appropriately for the proposed situation just for explanatory convenience without any intention of limiting the present invention thereto; thus, the singular form includes the plural form as well, unless the context clearly indicates otherwise.

Although the description has been made with reference to particular embodiments, the present invention can be implemented with various modifications without departing from the scope of the present invention. Thus, the present invention is not limited to the particular embodiments disclosed, and it will include the following claims and their equivalents.

<Second Embodiment>

Wireless communication systems have made much progress in providing superior communication quality in both hardware and software. For example, the legacy single antenna-based communication technologies have been replaced by multiple antenna-based communication technologies, and new data recovery technologies are being developed for recovering data from a physical signal more efficiency.

As one of the technologies to meet the growing demand of massive volume communication, multi-connectivity techniques have been proposed. For example, the carrier aggregation (CA) technique of long-term evolution (LTE) is capable of supporting multi-connectivity with a plurality of carrier frequencies. Accordingly, the user can receive a communication service using many resources.

A description is made of the method for maintaining multi-connectivity across different RATs during a handover in a wireless communication system according to the second embodiment of the present invention.

In particular, embodiment 2-1 of the present invention is directed to a situation where the source eNB transmits all packets before handover, embodiment 2-2 is directed to a situation of releasing the connection to the WLAN AP during the handover, embodiment 2-3 is directed to a situation of commanding erasure of the buffer of the WLAN AP, embodiment 2-4 is directed to a situation of reestablishing a connection to the WLAN in the LTE eNB handover, and embodiment 2-5 is directed to a situation of transmitting a PDCP header including a key sequence in order for the UE to receive packets.

Figure 6:
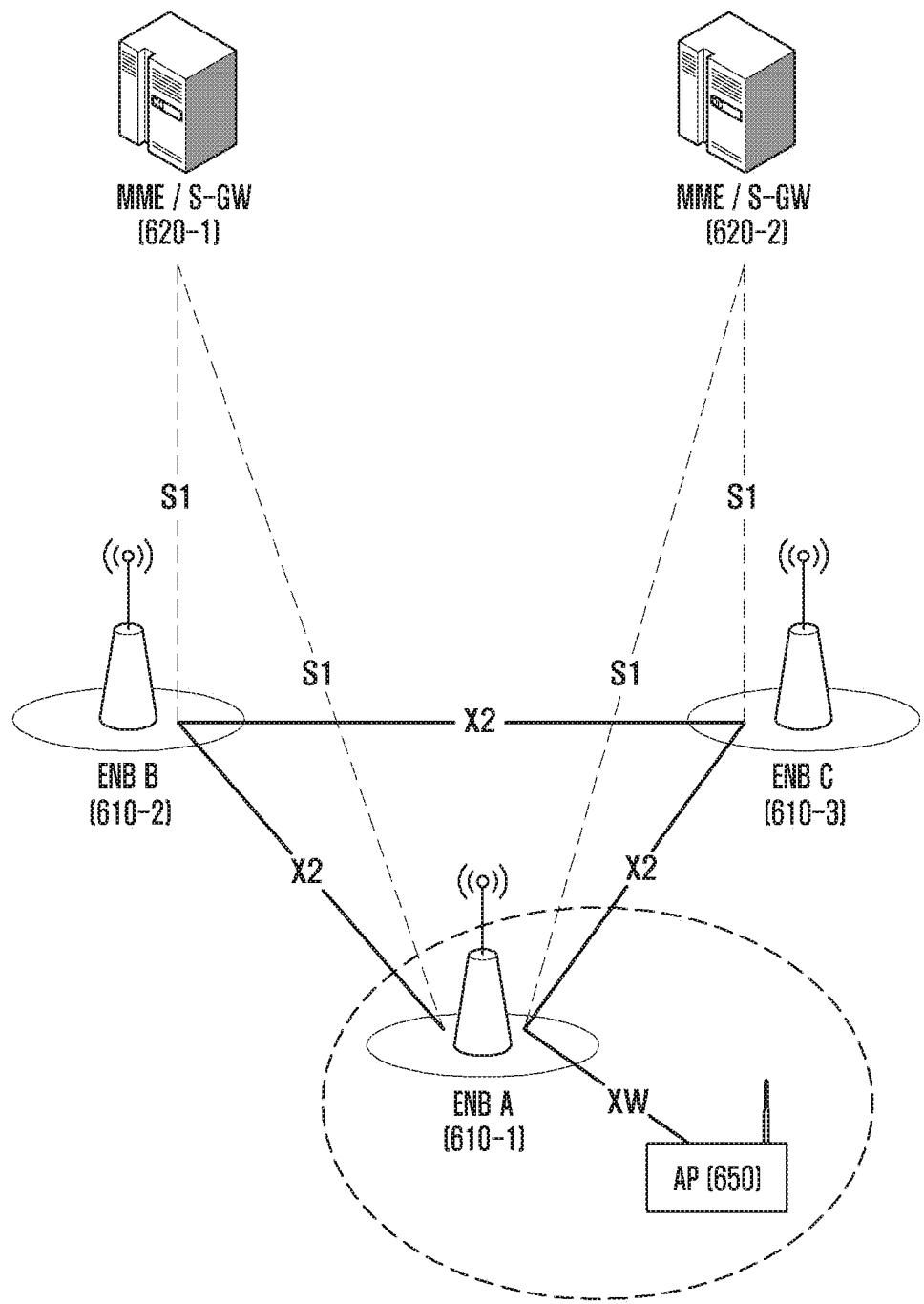
FIG. 6 is a diagram illustrating a network architecture of a wireless communication system according to an embodiment of the present invention.

FIG. 6 is a diagram illustrating a network architecture of a wireless communication system according to an embodiment of the present invention.

In reference to FIG. 6, the wireless communication system includes an eNB A 610-1, an eNB B 610-2, an eNB C 610-3, mobility management entity/serving gateways (MME/S-GWs) 620-1 and 620-2, and an access point (AP) 650. Although three eNBs are depicted in the drawing, the number of eNBs may be decreased to 2 or increased to 4 or more. Each of the MME/S-GWs 620-1 and 620-2 may be divided into an MME and an S-GW.

The eNBs 610-1, 610-2, and 610-3 are access nodes of the cellular network and provide radio connectivity to the UEs. That is, the eNBs 610-1, 610-2, and 610-3 provide links between the UE and the core network. According to various embodiments of the present invention, the eNB A 610-1 is capable of providing multi-connectivity to the UE using the AP 650.

The MME/S-GWs 620-1 and 620-2 manage mobility of the UEs. The MME/S-GWs 620-1 and 620-2 may also take charge of authentication and bearers of the UEs connected to the network. The MME/S-GWs 620-1 and 620-2 may process the packets that arrive from the eNBs 610-1, 610-2, and 610-3 and are to be forwarded to the eNBs 610-1, 610-2, and 610-3.

The AP 650 is an access node of the WLAN and provides radio connectivity to the UEs. According to various embodiments of the present invention, the AP 650 may provide WLAN-based multi-connectivity to the UE under the control of the eNB A 610-1. According to an embodiment of the present invention, the AP 650 may be integrated in the eNB A 610-1 or connected to the eNB A 610-1 through a separate interface. In this case, the eNB A 610-1 may transmit part of the data destined for the UE directly and the residual part of the data via the AP 650. The UE may transmit part of uplink data to the eNB A 610-1 and the remaining part of the uplink data via the AP 650.

The UE may connect to the cellular network via the eNB A 610-1. According to an embodiment of the present invention, the eNB A 610-1 may configure a connection of the UE to the AP 650 such that the UE communicates in a broader band. At this time, the service can be provided, even though a core network entity (e.g., MME, S-GW, and Packet Data Network Gateway (P-GW)) is not aware of the multi-connectivity configured in association with the AP 650. The multi-connectivity is called LTE-WLAN aggregation (integration or carrier aggregation (CA)).

In the case of implementing the multi-connectivity via the AP 650, it is necessary to determine a link for transmitting data. In downlink, the eNB A 610-1 may determine to deliver the data received from the core network to a UE directly or via the WLAN. In uplink, a UE may determine a data link to transmit data to the core network.

Figure 7:
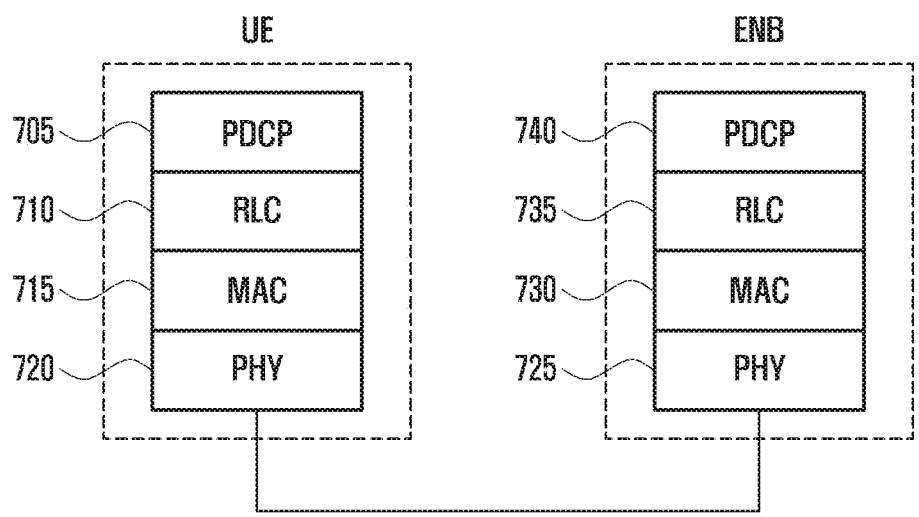
FIG. 7 is a diagram illustrating a radio protocol stack of an LTE system to which the present invention is applied.

FIG. 7 is a diagram illustrating a radio protocol stack of an LTE system to which the present invention is applied.

In reference to FIG. 7, the protocol stack of the interface between the UE and the eNB in the LTE system includes a plurality of protocol layers stacked from the bottom to the top: physical layer denoted by reference numbers 720 and 725, medium access control (MAC) layer denoted by reference numbers 715 and 730, radio link control (RLC) layer denoted by reference numbers 710 and 735, and packet data convergence control (PDCP) layer denoted by reference numbers 705 and 740. The PDCP layer denoted by reference numbers 705 and 740 takes charge of compressing/decompressing an IP header, and the RLC layer denoted by reference numbers 710 and 735 takes charge of segmenting a PDCP Packet Data Unit (PDU) into segments of appropriate size. The MAC layer denoted by reference numbers 715 and 730 allows for connection of multiple RLC entities established for one UE and takes charge of multiplexing RLC PDUs from the RLC layer into an MAC PDU and demultiplexing an MAC PDU into RLC PDUs. The PHY layer denoted by reference numbers 720 and 725 takes charge of channel-coding and modulation on higher layer data to generate and transmit OFDM symbols over a radio channel, and demodulating and channel-decoding on OFDM symbols received over the radio channel to deliver the decoded data to the higher layers. Also, the PHY layer uses hybrid ARQ (HARQ) for additional error correction by transmitting 1-bit information indicating for positive or negative acknowledgement from the receiver to the transmitter. This is referred to as HARQ ACK/NACK information. The downlink HARQ ACK/NACK corresponding to the uplink transmission is carried by physical hybrid-ARQ indicator channel (PHICH), and the uplink HARQ ACK/NACK corresponding to downlink transmission is carried by physical uplink control channel (PUCCH) or physical uplink shared channel (PUSCH).

Figure 8:
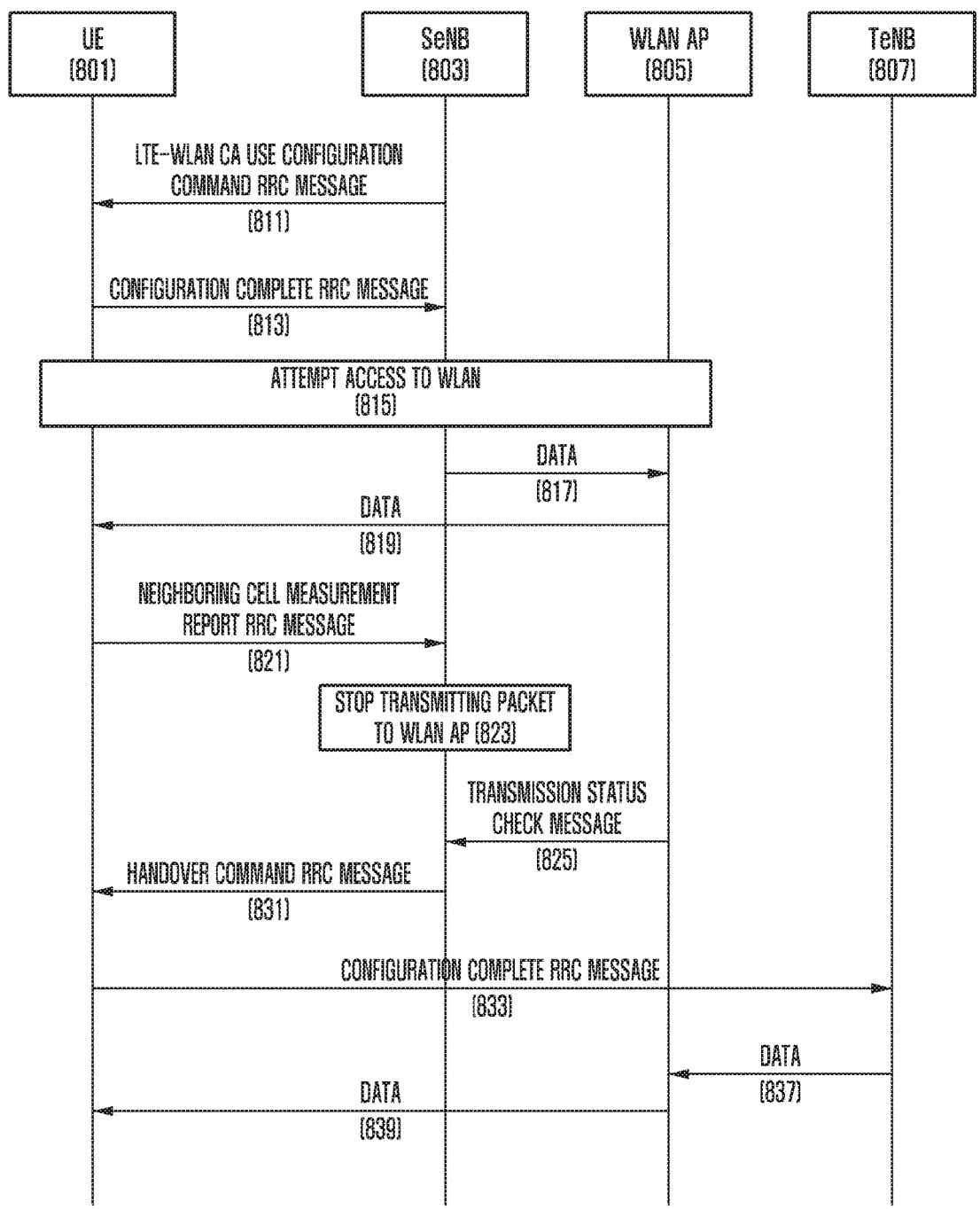
FIG. 8 is a signal flow diagram illustrating a procedure of a handover for a UE supporting the LTE-WLAN CA according to embodiment 2-1 of the present invention.

FIG. 8 is a signal flow diagram illustrating a procedure of a handover for a UE supporting the LTE-WLAN CA according to embodiment 2-1 of the present invention.

Embodiment 2-1 of the present invention is directed to a method for maintaining the multi-connectivity across different RATs even during a handover in such a way that the source eNB transmits all packets before the handover.

An LTE UE 801 that is connected to an LTE eNB 803 receives a message instructing configuration of a WLAN cell additional to the eNB 803 at step 811. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message includes identity information of a target WLAN AP and information on bearers permitted for use via the corresponding WLAN. For example, an important message concerning the control of the UE may be configured so as to be transmitted via only the LTE eNB for service stability.

Upon receipt of this message, the UE transmits at step 813 an RRC layer message for acknowledging successful receipt of the message. This RRC layer message may be the RRCConnectionReconfigurationComplete message. Next, the UE attempts access to a WLAN AP 805 with the target WLAN AP identifier at step 815. Alternatively, the UE 801 may make the attempt to access the WLAN AP 805 before transmitting the RRCConnectionReconfigurationComplete message.

Afterward, the eNB 803 transmits downlink data addressed to the UE 801 to the WLAN AP 805 at step 817, which delivers the data to the UE 801 at step 819.

The UE 801 may transmit a neighboring cell measurement report message to the eNB 803 at step 821 according to the configuration information received from the eNB 803. This message may be an RRC layer massage called MeasurementReport. Upon receipt of this message, the eNB 803 makes a handover decision to another eNB 807 in consideration of received signal strengths of the current and neighboring cells. If the handover decision to another cell is made, the current eNB 803 stops transmitting data to the WLAN AP 805 at step 823. Next, the eNB 803 may receive a transmission status report message from the WLAN AP 805 at step 825, the transmission status report message indicating packets delivered already to the UE 801. The eNB 803 determines that all packets transmitted via the WLAN AP 805 have been delivered to the UE 801 and then transmits a handover command to the UE 801 at step 831 to make a handover to the target eNB 807. Upon receipt of the handover command, the UE 801 achieves synchronization with the target eNB 807 and transmits a handover confirmation message to the target eNB 807 at step 833.

Assuming a scenario where the handover confirmation message transmitted at step 833 includes a command instructing that use of the WLAN AP 805 be maintained, the new eNB 807 may forward the corresponding data to the WLAN AP 805 at step 837, and the WLAN AP 805 delivers the data to the UE at step 839. As a consequence, the UE 801 can receive data continuously via the WLAN AP 805.

Figure 9:
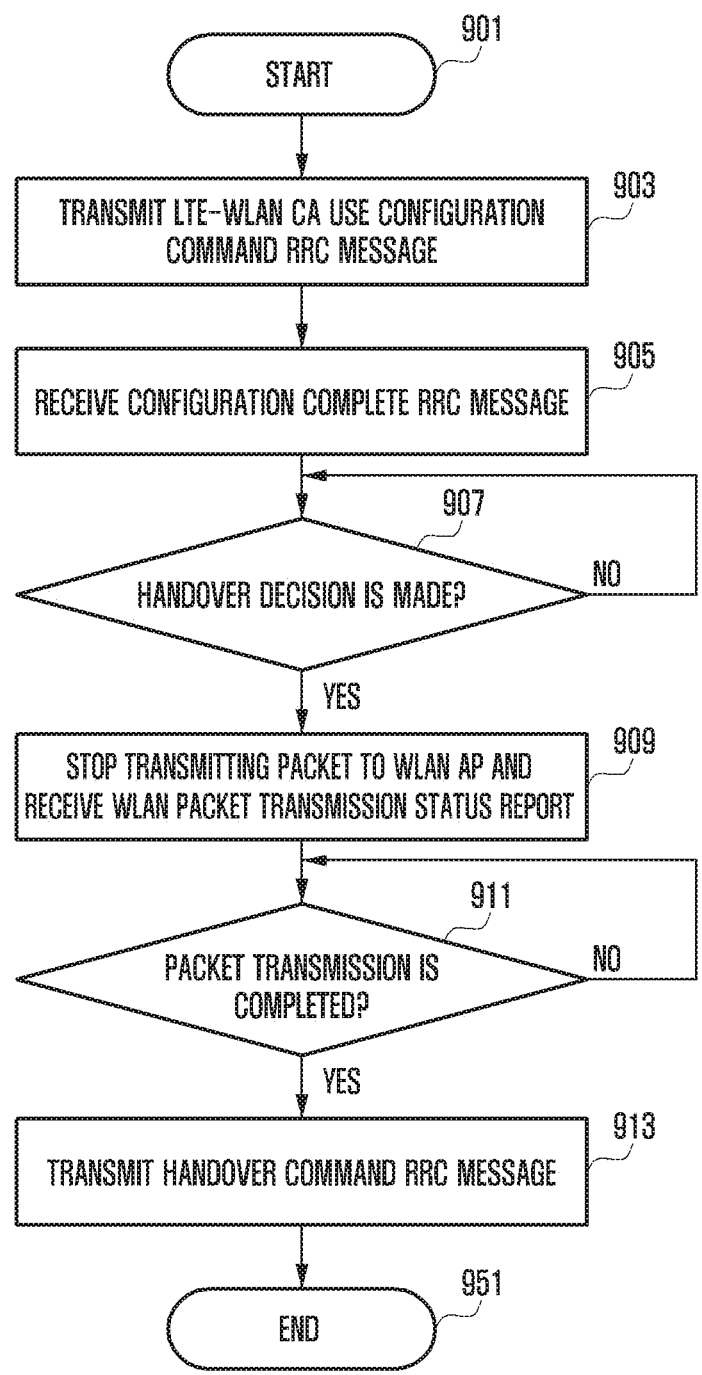
FIG. 9 is a flowchart illustrating an operation of an eNB for a handover of a UE using the LTE-WLAN CA according to embodiment 2-1 of the present invention.

FIG. 9 is a flowchart illustrating an operation of an eNB for a handover of a UE using the LTE-WLAN CA according to embodiment 2-1 of the present invention.

The LTE eNB transmits an RRC layer message called RRCConnectionReconfiguration to the UE to configure an additional WLAN cell at step 903. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message may include identity information of a target WLAN AP and information on bearers permitted for use via the corresponding WLAN.

Afterward, the eNB receives at step 905 an RRC layer message acknowledging successful receipt of the message. This RRC layer message may be the RRCConnectionReconfigurationComplete message.

The eNB receives a neighboring cell signal strength report message (e.g., MeasurementReport of RRC layer) from the UE and determines at step 907 whether to make a handover for the UE to a target eNB. If it is determined to make a handover to a target eNB, the eNB may receive a transmission status report message from the WLAN AP at step 909, the transmission status report message indicating packets delivered already to the UE. The eNB determines at step 911 whether all packets have been delivered via the WLAN AP and, if so, transmits a handover command to the UE at step 913.

Figure 10:
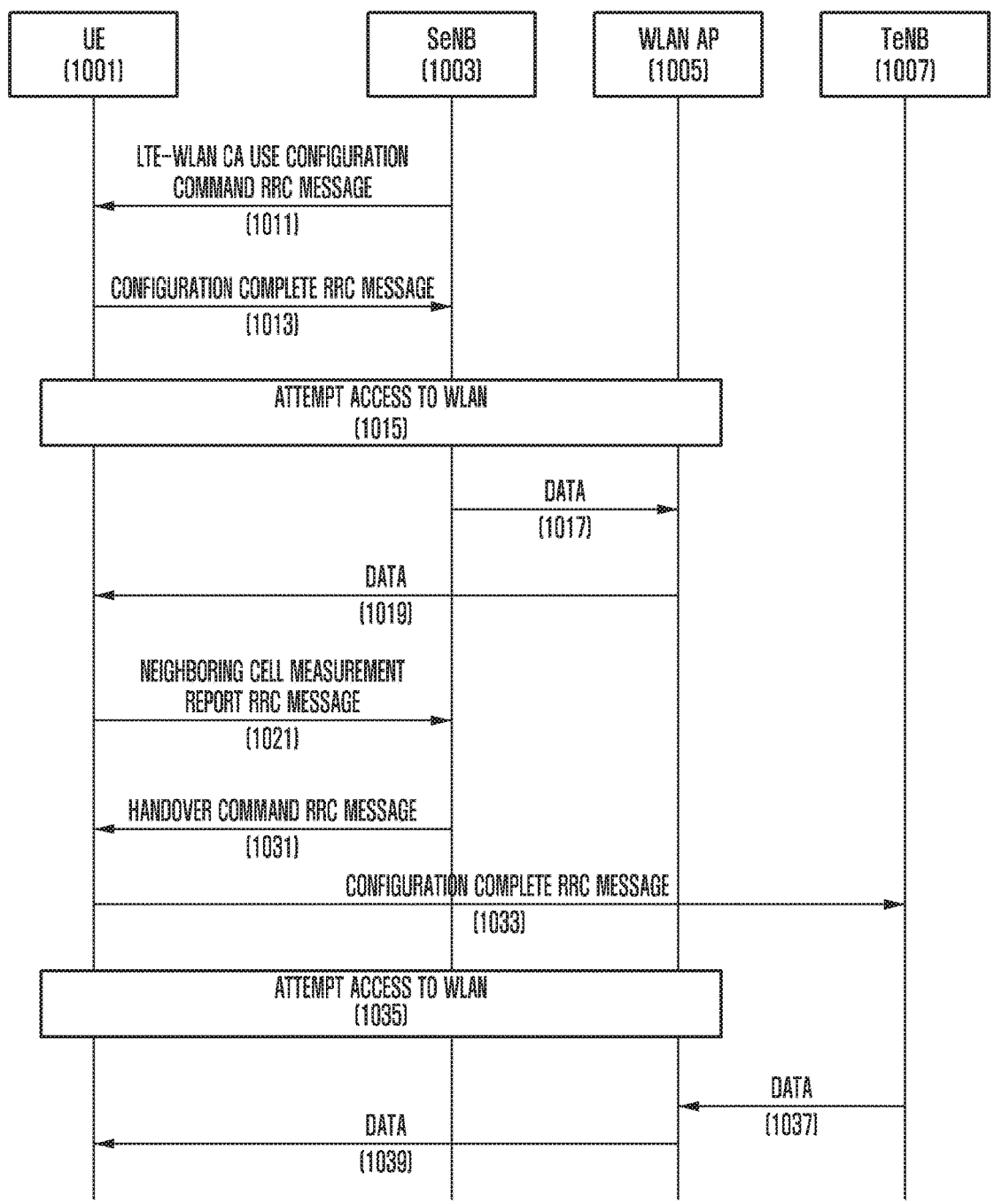
FIG. 10 is a signal flow diagram illustrating a procedure of a handover for a UE supporting the LTE-WLAN CA according to embodiment 2-2 of the present invention.

FIG. 10 is a signal flow diagram illustrating a procedure of a handover for a UE supporting the LTE-WLAN CA according to embodiment 2-2 of the present invention.

Embodiment 2-2 of the present invention is directed to a method for maintaining the multi-connectivity across different RATs even during a handover in such a way of releasing a WLAN AP connection.

An LTE UE 1001 that is connected to an LTE eNB 1003 receives a message instructing configuration of a WLAN cell additional to the eNB 1003 at step 1011. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message includes identity information of a target WLAN AP and information on bearers permitted for use via the corresponding WLAN. For example, an important message concerning the control of the UE may be configured so as to be transmitted via only the LTE eNB for service stability.

Upon receipt of this message, the UE 1001 transmits an RRC layer message for acknowledging successful receipt of the message at step 1013. This RRC layer message may be the RRCConnectionReconfigurationComplete message. Next, the UE 1001 attempts access to a WLAN AP 1005 with the target AP identifier at step 1015. Alternatively, the UE 1001 may make the attempt to access the WLAN AP 1005 before transmitting the RRCConnectionReconfigurationComplete message.

Afterward, the eNB 1003 transmits downlink data addressed to the UE 1001 to the WLAN AP 1005 at step 1017, and the WLAN AP 1005 delivers the data to the UE 1001 at step 1019.

The UE 1011 may transmit a neighboring cell signal strength report message to the eNB 1003 at step 1021 according to the configuration information provided by the eNB 1003. This message may be an RRC layer message called MeasurementReport. Upon receipt of this message, the eNB 1003 makes a handover decision to another eNB 1007 in consideration of received signal strengths of the current and neighboring cells. If the handover decision to another cell is made, the eNB 1003 transmits a handover command to the UE 1001 at step 1031.

Upon receipt of the handover command, the UE 1001 releases the connection established with the WLAN AP 1005, achieves synchronization with the target eNB 1007, and transmits to the target eNB 1007 a handover confirmation message at step 1033.

Assuming a scenario where the handover command message transmitted at step 1031 includes a command instructing that use of the WLAN AP 1005 be maintained, the UE 1001 transmits a handover confirmation message to the target eNB 1007 at step 1033 and then reestablishes a connection to the WLAN AP 1005 at step 1035. Afterward, the target eNB 1007 forwards the data to the WLAN AP 1005 at step 1037, and the WLAN AP 1005 delivers the data to the UE 1001 at step 1039.

As a consequence, the UE can receive data continuously via the WLAN AP 1005.

Figure 11:
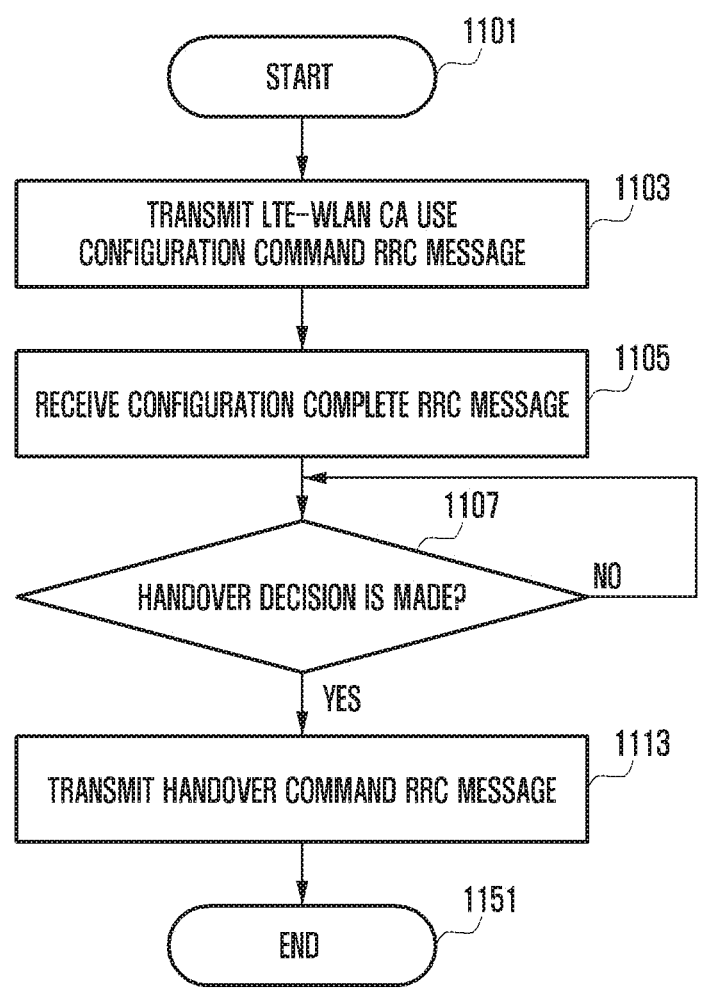
FIG. 11 is a flowchart illustrating an operation of an eNB for handover of a UE using the LTE-WLAN CA according to embodiment 2-2 of the present invention.

FIG. 11 is a flowchart illustrating an operation of an eNB for handover of a UE using the LTE-WLAN CA according to embodiment 2-2 of the present invention.

The LTE eNB transmits at step 1103 an RRC layer message called RRCConnectionReconfiguration to the UE to configure an additional WLAN cell. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message may include identity information of a target WLAN AP and information on bearers permitted for use via the corresponding WLAN.

Afterward, the eNB receives at step 1105 an RRC layer message acknowledging successful receipt of the message. This RRC layer message may be the RRCConnectionReconfigurationComplete message.

The eNB receives a neighboring cell signal strength report message (e.g., MeasurementReport of RRC layer) from the UE and determines at step 1107 whether to make a handover for the UE to a target eNB. If it is determined to make a handover to a target eNB, the eNB may transmit a handover command to the UE at step 1113.

Figure 12:
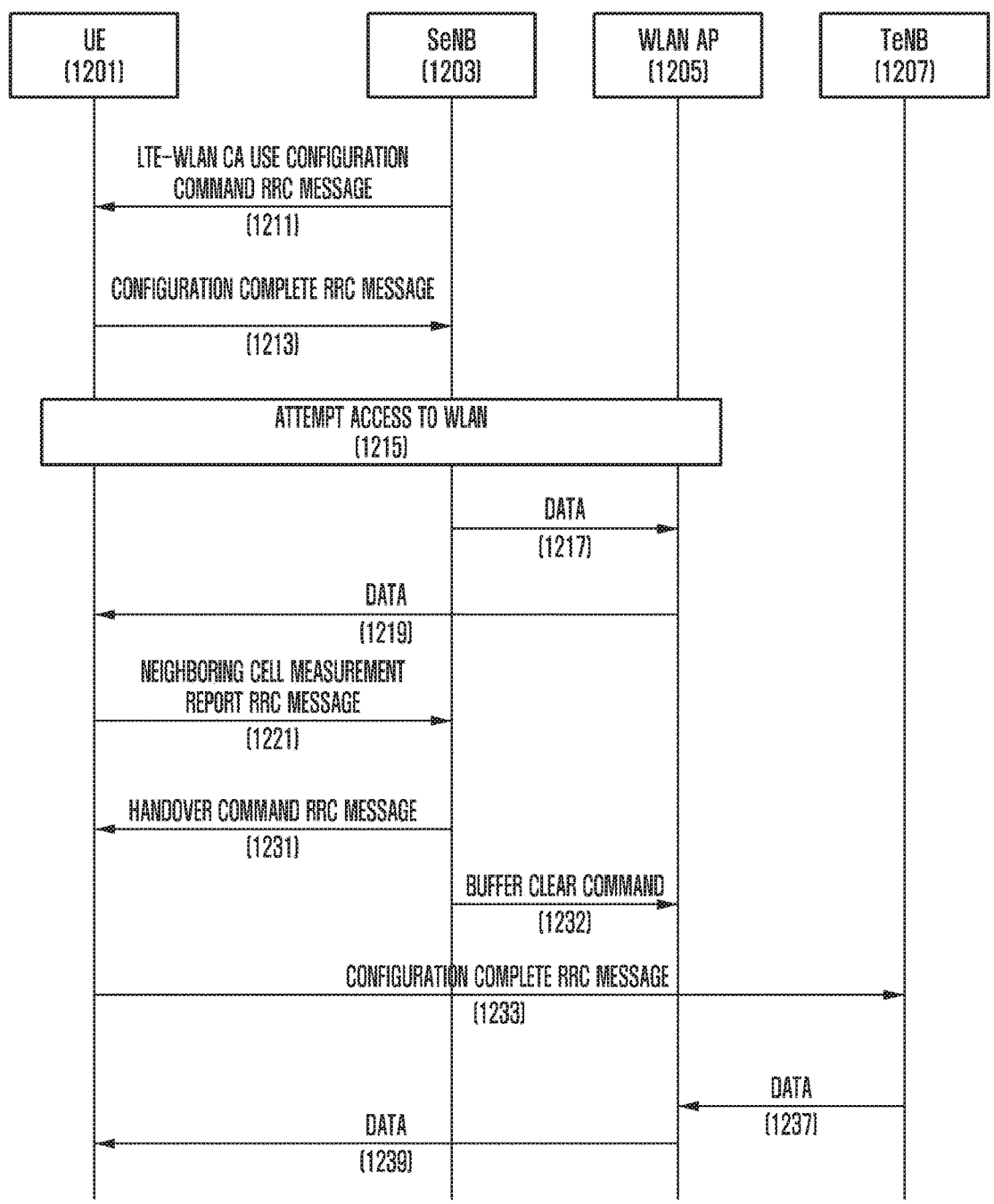
FIG. 12 is a signal flow diagram illustrating a procedure of a handover for a UE supporting the LTE-WLAN CA according to embodiment of 2-3 of the present invention.

FIG. 12 is a signal flow diagram illustrating a procedure of a handover for a UE supporting the LTE-WLAN CA according to embodiment 2-3 of the present invention.

Embodiment 2-3 of the present invention is directed to a method for maintaining the multi-connectivity across different RATs even during a handover in such a way that a source eNB commands the WLAN AP to erase its buffer.

An LTE UE 1201 that is connected to an LTE eNB 1203 receives at step 1003 a message instructing configuration of a WLAN cell additional to the eNB 1003. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message includes identity information of a target WLAN AP and information on bearers permitted for use via the corresponding WLAN. For example, an important message concerning the control of the UE may be configured so as to be transmitted via only the LTE eNB for service stability.

Upon receipt of this message, the UE 1201 transmits at step 1213 an RRC layer message for acknowledging successful receipt of the message. This RRC layer message may be the RRCConnectionReconfigurationComplete message. Next, the UE 1201 attempts access to a WLAN AP 1205 with the target AP identifier at step 1215. Alternatively, the UE 1201 may make the attempt to access the WLAN AP 1205 before transmitting the RRCConnectionReconfigurationComplete message.

Afterward, the eNB 1203 transmits downlink data addressed to the UE 1201 to the WLAN AP 1205 at step 1217, and the WLAN AP 1205 delivers the data to the UE 1201 at step 1219.

The UE 1201 may transmit a neighboring cell signal strength report message to the eNB 1203 at step 1221 according to the configuration information provided by the eNB 1203. This message may be an RRC layer message called MeasurementReport. Upon receipt of this message, the eNB 1203 makes a handover decision to another eNB 1207 in consideration of received signal strengths of the current and neighboring cells. If the handover decision to another cell is made, the eNB 1203 transmits a handover command to the UE 1201 at step 1231. The eNB 1203 also commands the WLAN AP 1205 to erase the data transmitted by the eNB 1203 (e.g., packets transmitted by the eNB 1203 at step 1217) from its buffer at step 1232.

Upon receipt of the handover command message, the UE 1201 achieves synchronization with the target eNB 1207 and transmits to the target eNB 1207 a handover confirmation message at step 1233.

Assuming a scenario where the handover confirmation message transmitted at step 1233 includes a command instructing that use of the WLAN AP 1205 be maintained, the target eNB 1207 may forward data to the WLAN AP 1205 at step 1237, and the WLAN AP 1205 delivers the data to the UE 1201 at step 1239. Then, the UE 1201 decodes the data with the encryption key in use by the target eNB 1207 to continue receiving the data via the WLAN AP 1205 at step 1239.

Figure 13:
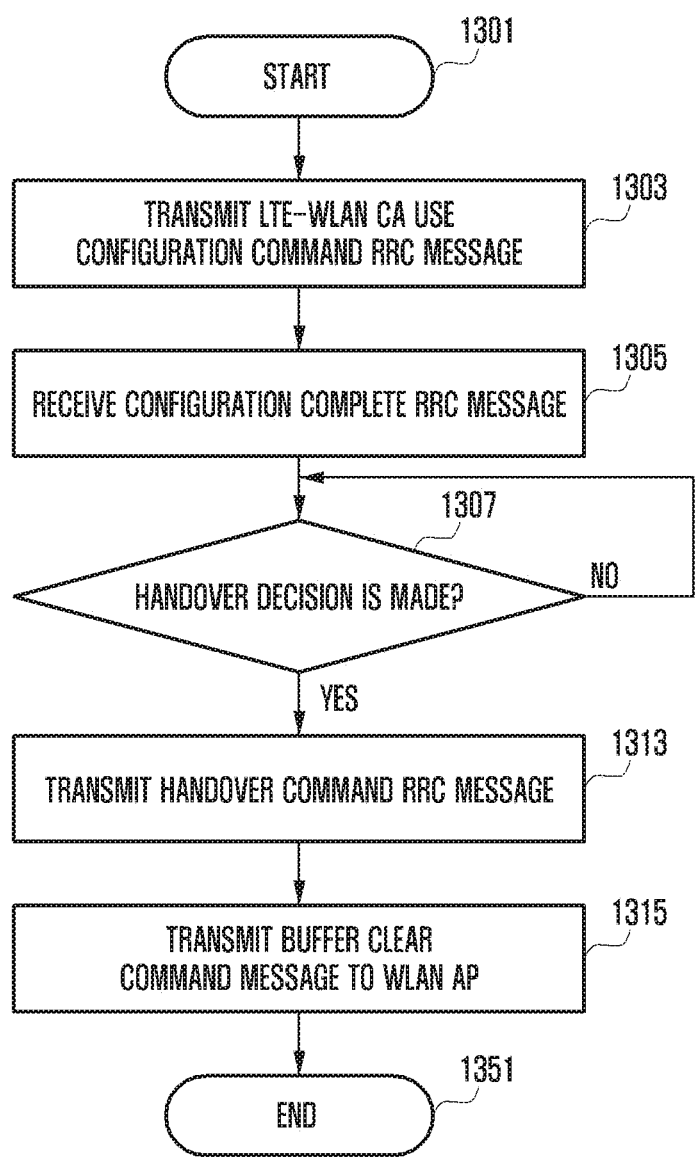
FIG. 13 is a flowchart illustrating an operation of an eNB for a handover of a UE using the LTE-WLAN CA according to embodiment 2-3 of the present invention.

FIG. 13 is a flowchart illustrating an operation of an eNB for a handover of a UE using the LTE-WLAN CA according to embodiment 2-3 of the present invention.

The LTE eNB transmits an RRC layer message called RRCConnectionReconfiguration to the UE to configure an additional WLAN cell at step 1303. This aims to use the LTE-WLAN aggregation multi-connectivity function described with reference to FIG. 1, and the message may be conveyed by the RRCConnectionReconfiguration message of a radio resource control (RRC) layer concerning control of LTE link layer. The message may include identity information of a target WLAN AP and information on bearers permitted for use via the corresponding WLAN.

Afterward, the eNB receives an RRC layer message acknowledging successful receipt of the message at step 1305. This RRC layer message may be the RRCConnectionReconfigurationComplete message.

The eNB receives a neighboring cell signal strength report message (e.g., MeasurementReport of RRC layer) from the UE and determines at step 1307 whether to make a handover for the UE to a target eNB. If it is determined to make a handover to a target eNB, the eNB transmits a handover command to the UE at step 1313. The eNB may also transmit to the WLAN at step 1315 a buffer clear command message to delete all data received from the eNB to avoid packet transmission failure via the WLAN AP after the handover.

Figure 14:
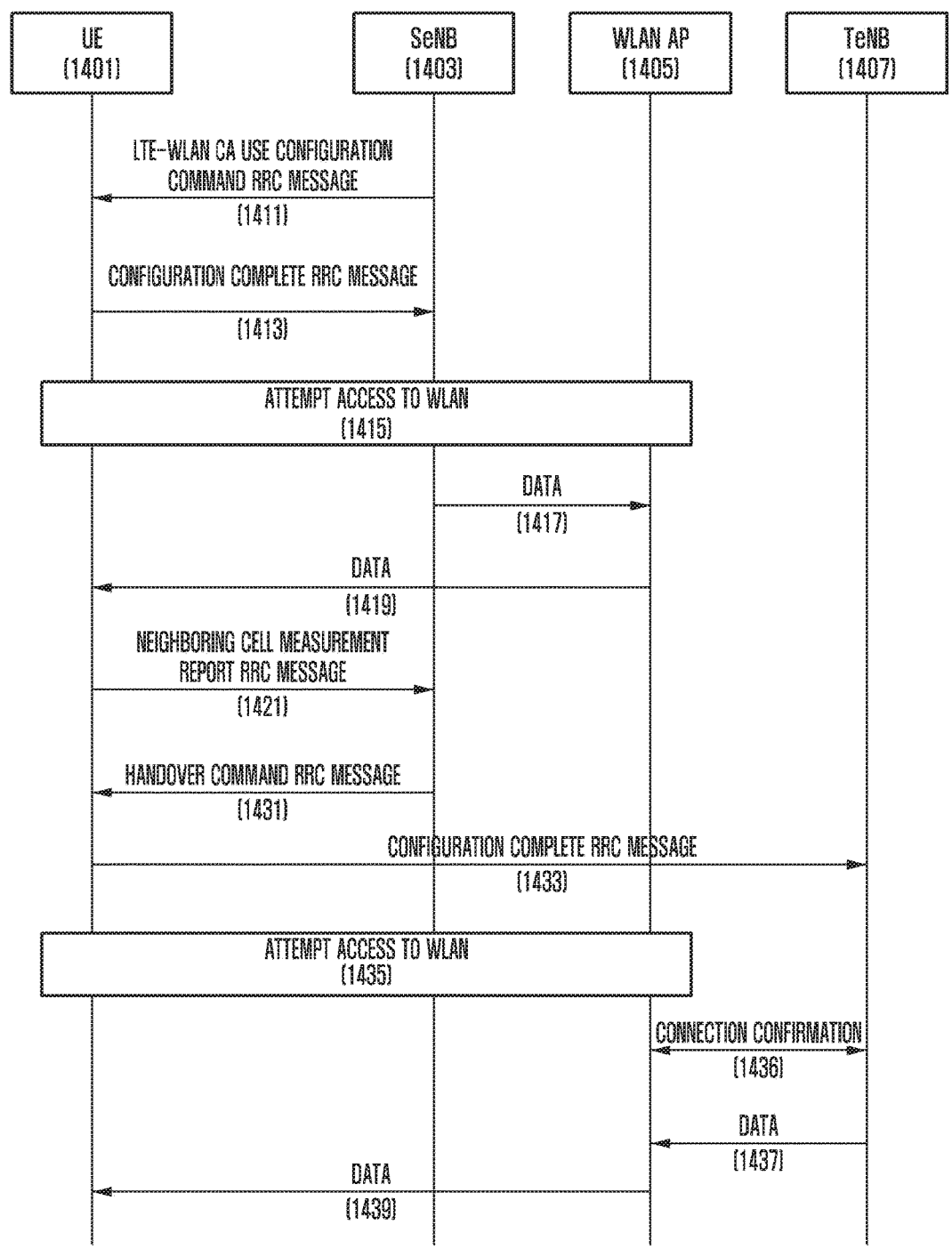
FIG. 14 is a signal flow diagram illustrating a procedure of a handover for a UE supporting the LTE-WLAN CA according to embodiment 2-4 of the present invention.

FIG. 14 is a signal flow diagram illustrating a procedure of a handover for a UE supporting the LTE-WLAN CA according to embodiment 2-4 of the present invention.

Embodiment 2-4 of the present invention is directed to a method for maintaining the multi-connectivity across different RATs even during an inter-LTE eNB handover in such a way of reestablishing a connection to the WLAN AP.

An LTE UE 1401 that is connected to an LTE eNB 1403 receives at step 1411 a message instructing configuration of a WLAN cell additional to the eNB 1403. This aims to use the LTE-WLAN aggregation multi-connectivity function described with reference to FIG. 6, and the message may be conveyed by the RRCConnectionReconfiguration message of a radio resource control (RRC) layer concerning control of LTE link layer. The message includes identity information of a target WLAN AP and information on bearers permitted for use via the corresponding WLAN. For example, an important message concerning the control of the UE may be configured so as to be transmitted via only the LTE eNB for service stability.

Upon receipt of this message, the UE 1401 transmits at step 1413 an RRC layer message for acknowledging successful receipt of the message. This RRC layer message may be the RRCConnectionReconfigurationComplete message. Next, the UE 1401 attempts access to a WLAN AP 1405 with the target AP identifier at step 1415. Alternatively, the UE 1401 may make the attempt to access the WLAN AP 1405 before transmitting the RRCConnectionReconfigurationComplete message.

Afterward, the eNB 1403 transmits downlink data addressed to the UE 1401 to the WLAN AP 1405 at step 1417, and the WLAN AP 1405 delivers the data to the UE 1401 at step 1419.

The UE 1401 may transmit a neighboring cell signal strength report message to the eNB 1403 at step 1421 according to the configuration information provided by the eNB 1403. This message may be an RRC layer message called MeasurementReport. Upon receipt of this message, the eNB 1403 makes a handover decision to another eNB 1407 in consideration of received signal strengths of the current and neighboring cells. If the handover decision to another cell is made, the eNB 1403 transmits a handover command to the UE 1401 at step 1431.

Upon receipt of the handover command, the UE 1401 achieves synchronization with the target eNB 1407 and transmits to the target eNB 1407 a handover confirmation message at step 1433.

Assuming a scenario where the handover command message transmitted at step 1431 includes a command instructing that use of the WLAN AP 1405 be maintained, the UE 1401 transmits a handover confirmation message to the target eNB 1407 at step 1433 and then performs a re-association procedure with the WLAN AP 1405 at step 1435. This re-association procedure may be performed with a Re-association Request message and a Re-association Response message, and if the WLAN AP re-association procedure is completed, the WLAN AP 1405 and the target eNB 1407 exchange messages at step 1436 to confirm that the UE 1401 has connected to the WLAN. Upon receipt of the Re-association Request message from the UE, the WLAN AP deletes all buffered packets addressed to the UE 1401 to prevent the data received before the handover from being mixed with the data from the target eNB 1407.

After this procedure, the target eNB 1407 forwards the data to the WLAN AP 1405 at step 1437, and the WLAN AP 1405 delivers the data to the UE 1401 at step 1439. Then, the UE 1401 can decode the data with the encryption key in use by the target eNB 1407 to continue receiving the data via the WLAN AP 1405 at step 1439.

Figure 15:
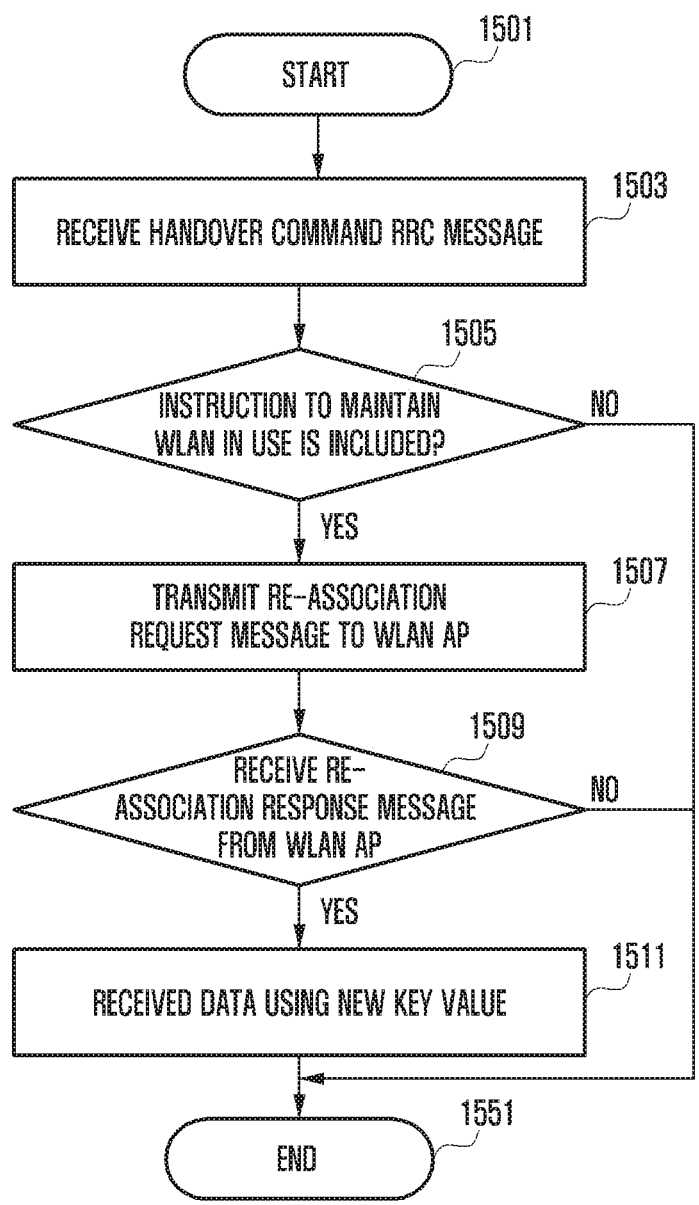
FIG. 15 is a flowchart illustrating an operation of a UE for handover of the UE using the LTE-WLAN CA according to embodiment 2-4 of the present invention.

FIG. 15 is a flowchart illustrating an operation of a UE for handover of the UE using the LTE-WLAN CA according to embodiment 2-4 of the present invention.

The UE receives a message commanding handover to another eNB from its serving eNB at step 1503. This message may be an RRC layer message called RRCConnectionReconfiguration.

The UE determines at step 1505 whether the handover command message includes a command instructing that the use of the WLAN AP be maintained and, if so, transmits a Re-association Request message to the WLAN AP to perform a re-association procedure with the WLAN AP at step 1507. Then, the UE determines at step 1509 whether a Re-association Response message is received from the WLAN AP and, if so, performs decoding data with the encryption key in use by the target eNB to which the handover has been performed successfully so as to continue receiving data via the WLAN AP at step 1511.

Figure 16:
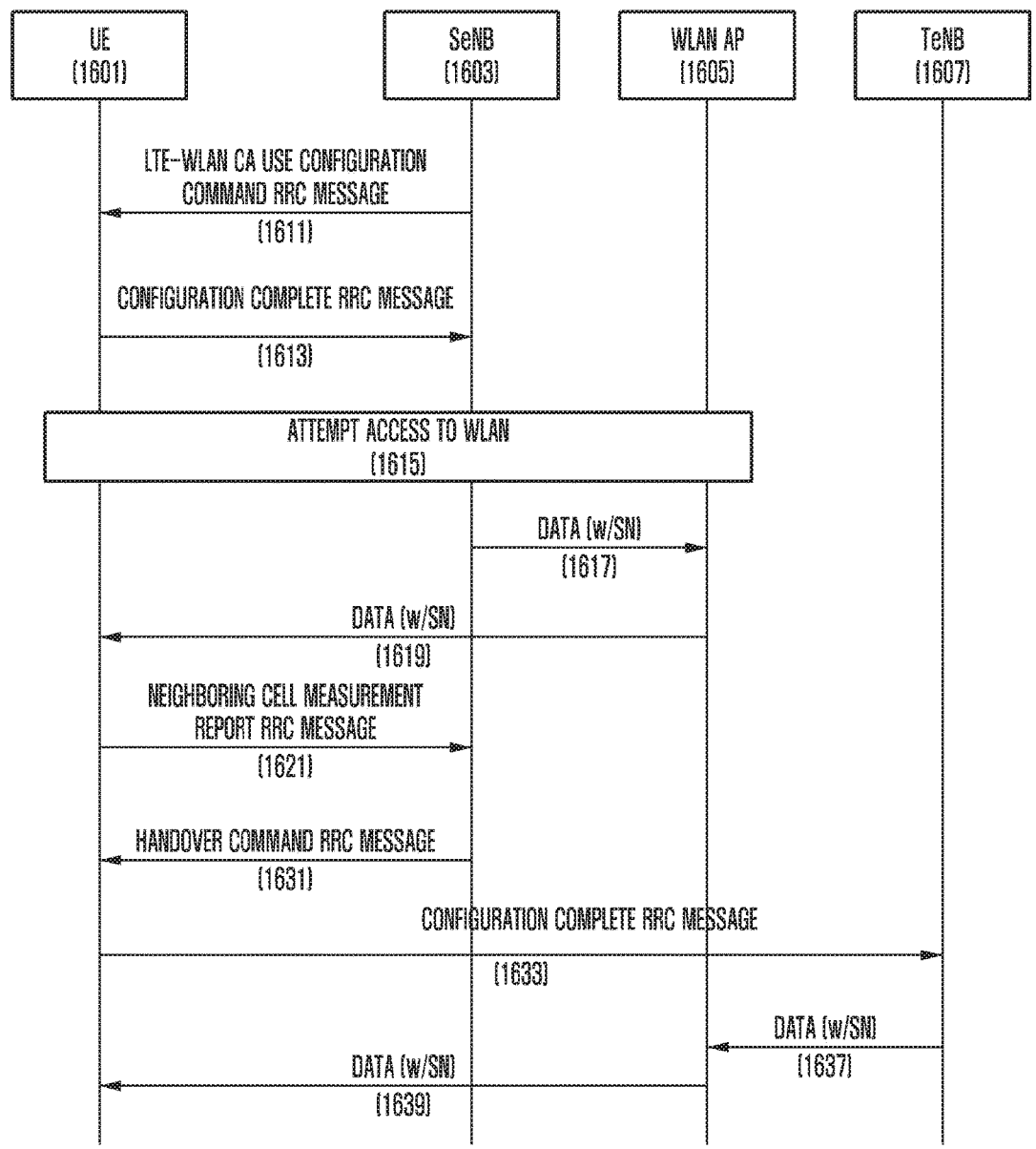
FIG. 16 is a signal flow diagram illustrating a procedure of a handover for a UE supporting the LTE-WLAN CA according to embodiment 2-5 of the present invention.

FIG. 16 is a signal flow diagram illustrating a procedure of a handover for a UE supporting the LTE-WLAN CA according to embodiment 2-5 of the present invention.

Embodiment 2-5 of the present invention is directed to a method for maintaining the multi-connectivity across different RATs even during a handover in a wireless communication system in such a way of allowing a UE to receive packets based on a key sequence included in a PDCP header.

An LTE UE 1601 that is connected to an LTE eNB 1603 receives at step 1611 a message instructing configuration of a WLAN cell additional to the eNB 1603. This aims to use the LTE-WLAN aggregation multi-connectivity function described with reference to FIG. 6, and the message may be conveyed by the RRCConnectionReconfiguration message of a radio resource control (RRC) layer concerning control of LTE link layer. The message includes identity information of a target WLAN AP and information on bearers permitted for use via the corresponding WLAN. For example, an important message concerning the control of the UE may be configured so as to be transmitted via only the LTE eNB for service stability.

Upon receipt of this message, the UE 1601 transmits at step 1613 an RRC layer message for acknowledging successful receipt of the message. This RRC layer message may be the RRCConnectionReconfigurationComplete message. Next, the UE 1601 attempts access to a WLAN AP 1605 with the target AP identifier at step 1615. Alternatively, the UE 1601 may make the attempt to access the WLAN AP 1605 before transmitting the RRCConnectionReconfigurationComplete message.

Afterward, the eNB 1603 transmits downlink data addressed to the UE 1601 to the WLAN AP 1605 at step 1617, and the WLAN AP 1605 delivers the data to the UE 1601 at step 1619. In the present invention, the encryption key in use by the eNB is transmitted to the UE 1601 in the PDCP header.

The UE 1601 may transmit a neighboring cell signal strength report message to the eNB 1603 at step 1621 according to the configuration information provided by the eNB 1603. This message may be an RRC layer message called MeasurementReport. Upon receipt of this message, the eNB 1603 makes a handover decision to another eNB 1607 in consideration of received signal strengths of the current and neighboring cells. If the handover decision to another cell is made, the eNB 1603 transmits a handover command to the UE 1601 at step 1631.

Upon receipt of the handover command, the UE 1601 achieves synchronization with the target eNB 1607 and transmits to the target eNB 1607 a handover confirmation message at step 1633.

Assuming a scenario where the handover command message transmitted at step 1631 includes a command instructing that use of the WLAN AP 1605 be maintined, the target eNB 1607 forwards data to the WLAN AP 1605 at step 1637, and the WLAN AP 1605 delivers the data to the UE 1601 at step 1639. In the present invention, the encryption key in use by the eNB is transmitted to the UE 1601 in the PDCP header. Then, the UE 1601 can decode the data with the encryption key included in the PDCP header to continue receiving the data via the WLAN AP 1605 at step 1639.

In the case of transmitting the PDCP packet including the encryption key, however, an exceptional situation may occur as follows. Although the PDCP packet is transmitted with a new security key, the UE may not have yet the information on the new security key. In this case, the UE may discard the corresponding packet or buffer the packet until the information on the new encryption key is received from the eNB for use in decoding the packet. Alternatively, although the PDCP packet is transmitted with an old security key, the UE may already have deleted the information on the old encryption key and, in this case, it is proposed to discard the corresponding packet.

Figure 17:
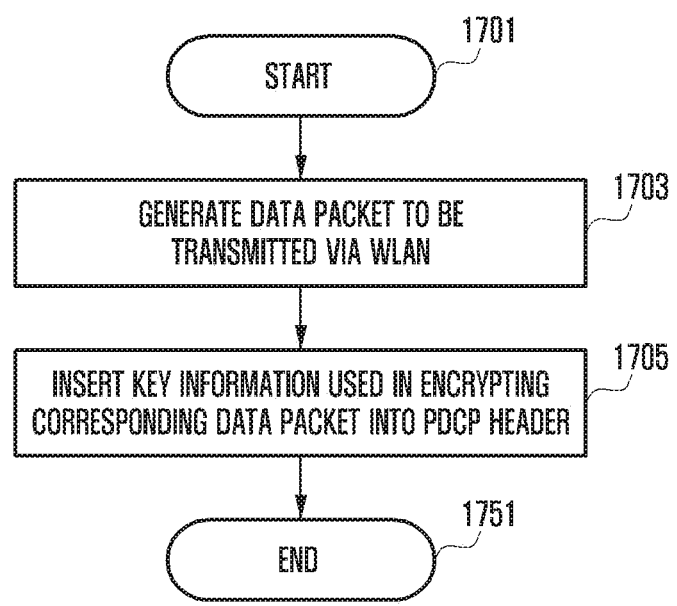
FIG. 17 is a flowchart illustrating an operation of an eNB for handover of the UE using the LTE-WLAN CA according to embodiment 2-5 of the present invention.

FIG. 17 is a flowchart illustrating an operation of an eNB for handover of the UE using the LTE-WLAN CA according to embodiment 2-5 of the present invention.

If a downlink packet arrives, the eNB generates at step 1703 a data packet to be transmitted via a WLAN and inserts at step 1705 an encryption key used for encrypting the data packet into the PDCP header.

Figure 18:
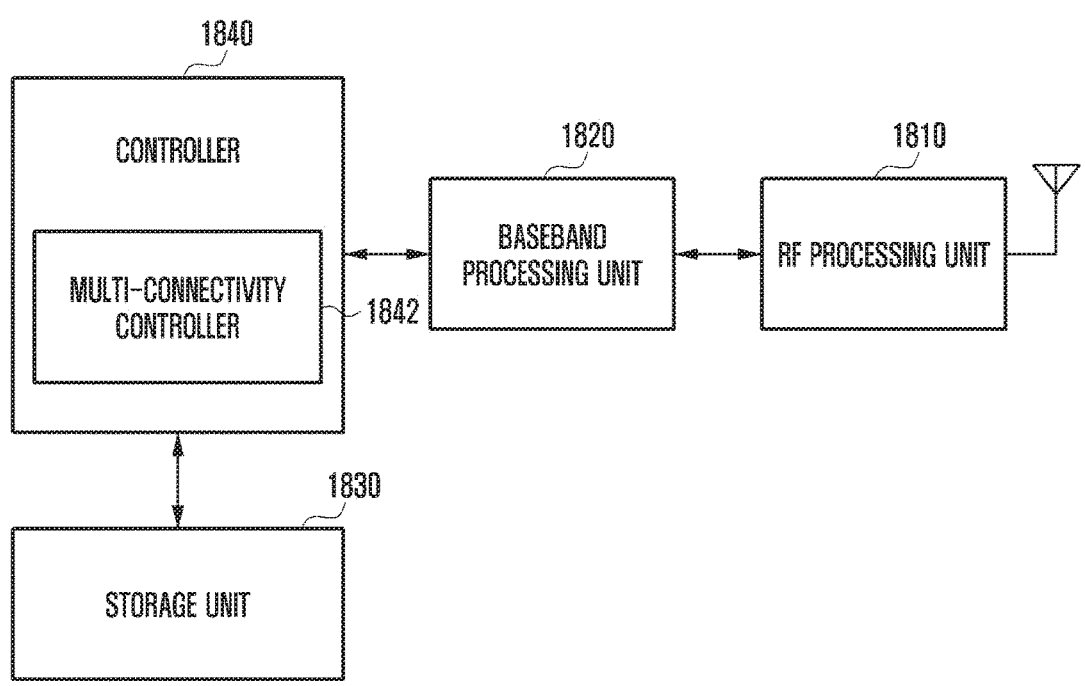
FIG. 18 is a block diagram illustrating a configuration of a UE in a wireless communication system according to an embodiment of the present invention.

FIG. 18 is a block diagram illustrating a configuration of a UE in a wireless communication system according to an embodiment of the present invention.

In reference to FIG. 18, the UE includes a radio frequency (RF) processing unit 1810, a baseband processing unit 1820, a storage unit 1830, and a controller 1840.

The RF processing unit 1810 takes charge of signal band conversion and amplification for transmitting signals over a radio channel. That is, the RF processing unit 1810 up-converts a baseband signal output from the baseband processing unit 1820 to an RF band signal for transmission through antennas and down-converts an RF band signal received through the antennas to a baseband signal. For example, the RF processing unit 1810 may include a transmission filter, a reception filter, an amplifier, a mixer, an oscillator, a digital-to-analog converter (DAC), and an analog-to-digital convertor (ADC). Although one antenna is depicted in FIG. 18, the UE may include a plurality of antennas. The RF processing unit may include a plurality of RF chains. The RF processing unit 1810 may perform beamforming. For beamforming, the RF processing unit 1810 may adjust the phases and sizes of the signal transmitted/received through the antennas or antenna elements.

The baseband processing unit 1820 takes charge of converting between baseband signals and bit strings according to a physical layer protocol of the system. For example, the baseband processing unit 1820 performs encoding and modulation on the transmit bit strings to generate complex symbols in data transmission mode. The baseband processing unit 1820 also performs demodulation and decoding on the baseband signal from the RF processing unit 1810 to recover the received bit strings in data reception mode. For the case of an orthogonal frequency division multiplexing (OFDM) system, the baseband processing unit 1820 performs encoding and modulation on the transmit bit string to generate complex symbols, maps the complex symbols to subcarriers, performs inverse fast Fourier transform (IFFT) on the subcarriers, and inserts a cyclic prefix (CP) to generate OFDM symbols in the data transmit mode. The baseband processing unit 1820 splits the baseband signal from the RF processing unit 1810 into OFDM symbols, recovers the signals mapped to the subcarriers through fast Fourier transform (FFT), and performs demodulation and decoding to recover the bit strings in the data reception mode.

The baseband processing unit 1820 and the RF processing unit 1810 take charge of transmitting and receiving signals as described above. Accordingly, the baseband processing unit 1820 and the RF processing unit 1810 may be referred to as a transmission unit, a reception unit, a transceiver, or a communication unit. At least one of the baseband processing unit 1820 and the RF processing unit 1810 may include a plurality of communication modules for supporting different radio access technologies. At least one of the baseband processing unit 1820 and the RF processing unit 1810 may include a plurality of communication modules for processing different frequency band signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz). The storage unit 1830 stores basic programs for operation of the UE, application programs, and data such as configuration information. In particular, the storage unit 1830 may store the information related to the secondary access node with which the UE performs radio communication using the secondary radio access technology.

The storage unit 1830 provides the stored data in response to a request from the controller 1840.

The controller 1840 controls overall operations of the UE. For example, the controller 1840 controls the baseband processing unit 1820 and the RF processing unit 1810 to transmit/receive signals. The controller 1840 also writes and reads data to and from the storage unit 1840. In order to accomplish this, the controller 1840 may include at least one processor. For example, the controller 1840 may include a communication processor (CP) for controlling communication and an application processor (AP) for controlling higher layers such as application programs. According to an embodiment of the present invention, the controller 1840 includes a multi-connectivity processing unit 1842. For example, the controller 1840 may control the UE to perform the UE operations and procedures described with reference to FIG. 7. The controller 1840 operates as follows according to an embodiment of the present invention.

According to an embodiment of the present invention, if it is intended to continue using a WLAN AP during a handover, the controller 1840 controls to transmit a re-association request message to the corresponding WLAN AP, to receive a re-association response message, and to decode packets from the WLAN AP with an encryption key in use by the eNB to which the UE is handed over.

Figure 19:
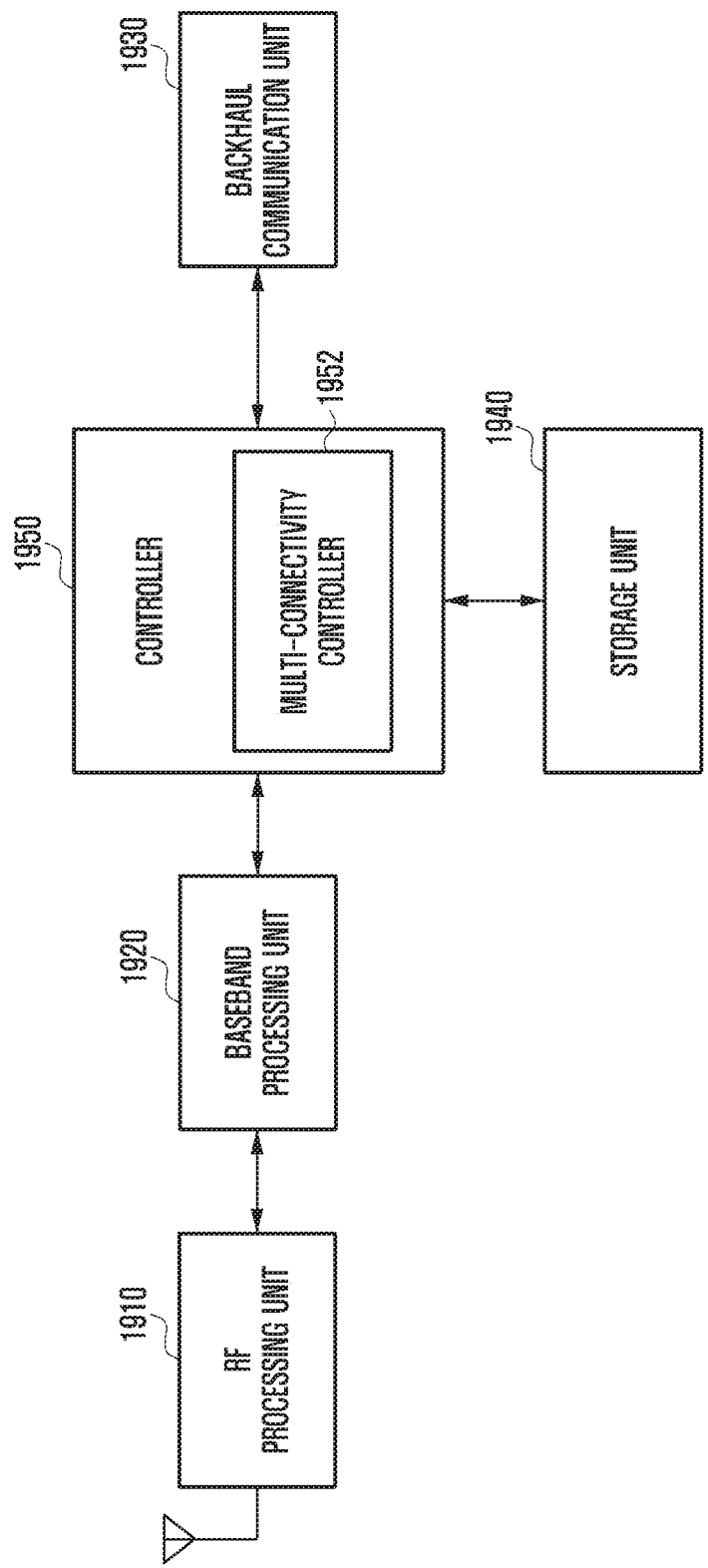
FIG. 19 is a block diagram illustrating a configuration of a primary access node in a wireless communication system according to an embodiment of the present invention.

FIG. 19 is a block diagram illustrating a configuration of a primary access node in a wireless communication system according to an embodiment of the present invention.

As shown in FIG. 19, the primary access node includes an RF processing unit 1910, a baseband processing unit 1920, a backhaul communication unit 1930, a storage unit 1940, and a controller 1950.

The RF processing unit 1910 takes charge of signal band conversion and amplification for transmitting signals over a radio channel. That is, the RF processing unit 1910 up-converts a baseband signal output from the baseband processing unit 1920 to an RF band signal for transmission through antennas and down-converts an RF band signal received through the antennas to a baseband signal. For example, the RF processing unit 1910 may include a transmission filter, a reception filter, an amplifier, a mixer, an oscillator, a DAC, and an ADC. Although one antenna is depicted in FIG. 19, the primary access node may include a plurality of antennas. The RF processing unit 1910 may include a plurality of RF chains. The RF processing unit 1910 may perform beamforming. For beamforming, the RF processing unit 1910 may adjust the phases and sizes of the signal transmitted/received through the antennas or antenna elements.

The baseband processing unit 1920 takes charge of converting between baseband signals and bit strings according to a physical layer protocol of the system. For example, the baseband processing unit 1920 performs encoding and modulation on the transmit bit strings to generate complex symbols in data transmission mode. The baseband processing unit 1920 also performs demodulation and decoding on the baseband signal from the RF processing unit to recover the received bit strings in data reception mode. For the case of an OFDM system, the baseband processing unit 1920 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 1920 splits the baseband signal from the RF processing unit 1910 into OFDM symbols, recovers the signals mapped to the subcarriers through FFT, and performs demodulation and decoding to recover the bit strings in the data reception mode. The baseband processing unit 1920 and the RF processing unit 1910 take charge of transmitting and receiving signals as described above. Accordingly, the baseband processing unit 1920 and the RF processing unit 1910 may be referred to as a transmission unit, a reception unit, a transceiver, or a communication unit.

The backhaul communication unit 1930 provides an interface for communication with other network nodes. That is, the backhaul communication unit 1930 converts the bit string to be transmitted from the primary access node to another node such as another access node and core network to a physical signal, and converts the physical signal received from another node to a bit string.

The storage unit 1940 stores basic programs for operation of the primary access node, application programs, and data such as configuration information.

In particular, the storage unit 1940 may store the information on the bearers allocated to the connected UE and measurement result reported by the UE. The storage unit 1940 may also store the information as criteria for determining whether to enable or disable multi-connectivity for the UE. The storage unit 1940 provides the stored data in response to a request from the controller 1950.

The controller 1950 may control overall operations of the primary access node. For example, the controller 1950 controls the baseband processing unit 1920, the RF processing unit 1910, and the backhaul communication unit 1930 for transmitting/receiving signals. The controller 1950 also writes and reads data to and from the storage unit 1940. In order to accomplish this, the controller 1950 may include at least one processor. The controller 1950 operates as follows according to an embodiment of the present invention.

According to an embodiment of the present invention, the controller 1950 may control to transmit a buffer erase command message to a WLAN AP in order for a UE to receive data via the WLAN AP correctly even after the UE has been handed over to a new eNB.

Figure 20:
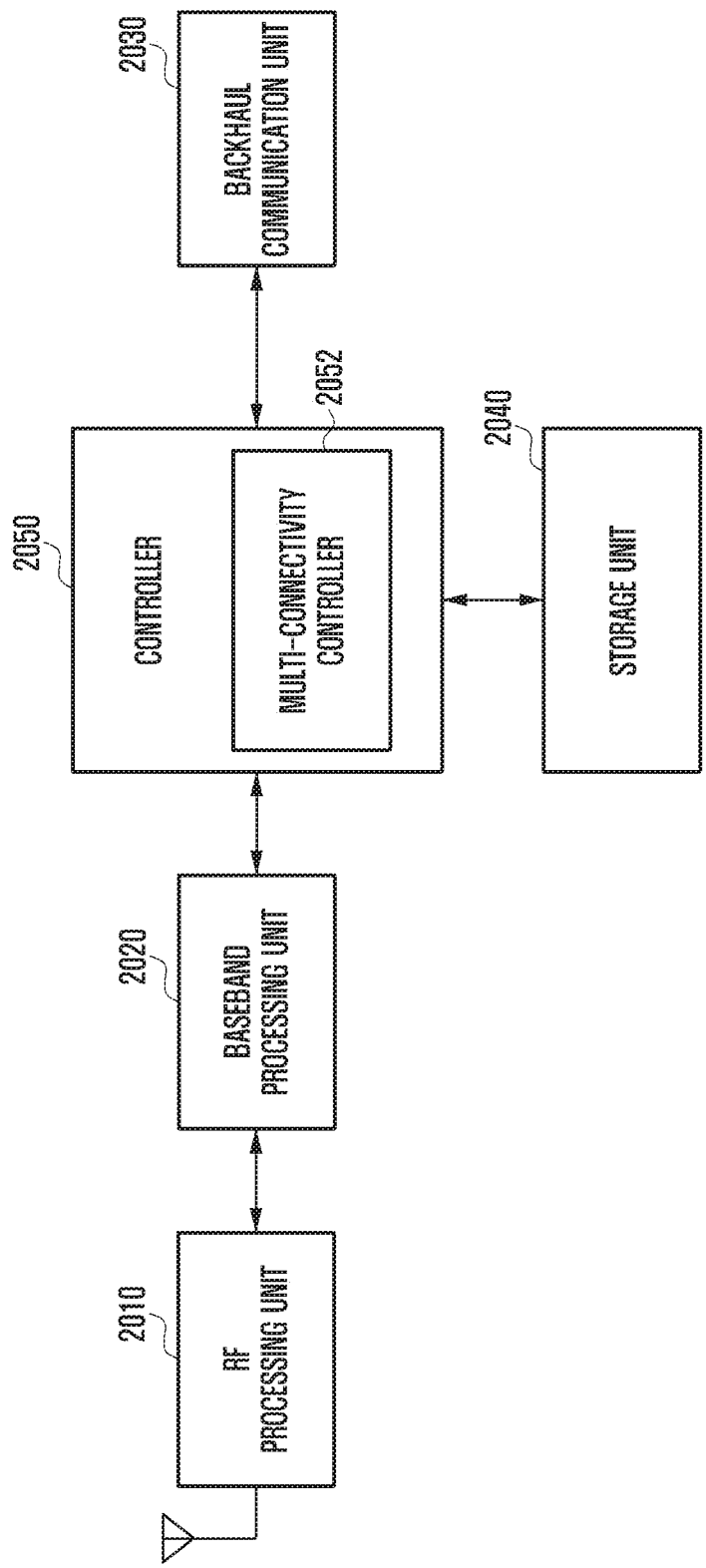
FIG. 20 is a block diagram illustrating a configuration of a secondary access node in a wireless communication system according to an embodiment of the present invention.

FIG. 20 is a block diagram illustrating a configuration of a secondary access node in a wireless communication system according to an embodiment of the present invention.

As shown in FIG. 20, the secondary access node includes an RF processing unit 2010, a baseband processing unit 2020, a backhaul communication unit 2030, a storage unit 640, and a controller 2050.

The RF processing unit 2010 takes charge of signal band conversion and amplification for transmitting signals over a radio channel. That is, the RF processing unit 2010 up-converts a baseband signal output from the baseband processing unit 2020 to an RF band signal for transmission through antennas and down-converts an RF band signal received through the antennas to a baseband signal. For example, the RF processing unit 2010 may include a transmission filter, a reception filter, an amplifier, a mixer, an oscillator, a DAC, and an ADC. Although one antenna is depicted in FIG. 20, the secondary access node may include a plurality of antennas. The RF processing unit 2010 may include a plurality of RF chains. The RF processing unit 2010 may perform beamforming. For beamforming, the RF processing unit 2010 may adjust the phases and sizes of the signal transmitted/received through the antennas or antenna elements.

The baseband processing unit 2020 takes charge of converting between baseband signals and bit strings according to a physical layer protocol of the system. For example, the baseband processing unit 2020 performs encoding and modulation on the transmit bit strings to generate complex symbols in data transmission mode. The baseband processing unit 2020 also performs demodulation and decoding on the baseband signal from the RF processing unit to recover the received bit strings in data reception mode. For the case of an OFDM system, the baseband processing unit 2020 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 2020 splits the baseband signal from the RF processing unit 2010 into OFDM symbols, recovers the signals mapped to the subcarriers through FFT, and performs demodulation and decoding to recover the bit strings in the data reception mode. The baseband processing unit 2020 and the RF processing unit 2010 take charge of transmitting and receiving signals as described above. Accordingly, the baseband processing unit 2020 and the RF processing unit 2010 may be referred to as a transmission unit, a reception unit, a transceiver, or a communication unit.

The backhaul communication unit 2030 provides an interface for communication with other network nodes. That is, the backhaul communication unit 2030 converts the bit string to be transmitted from the secondary access node to another node such as another access node and core network to a physical signal, and converts the physical signal received from another node to a bit string.

The storage unit 2040 stores basic programs for operation of the secondary access node, application programs, and data such as configuration information.

In particular, the storage unit 2040 may store the information on the bearers allocated to the connected UE and measurement result reported by the UE. The storage unit 2040 may also store the information as criteria for determining whether to enable or disable multi-connectivity for the UE. The storage unit 2040 provides the stored data in response to a request from the controller 2050.

The controller 2050 may control overall operations of the secondary access node. For example, the controller 2050 controls the baseband processing unit 2020, the RF processing unit 2010, and the backhaul communication unit 2030 for transmitting/receiving signals. The controller 2050 also writes and reads data to and from the storage unit 2040. In order to accomplish this, the controller 2040 may include at least one processor.

According to an embodiment of the present invention, the controller 2050 controls to delete all packets received from the source eNB based on a buffer erase command received from an LTE eNB or to transmit a re-association response message in response to a re-association request message from a UE in order for the UE to receive data correctly via a WLAN AP even after the UE has been handed over to a new eNB.

The methods specified in the claims and embodiments of the specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the present invention.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. Alternatively, it may also be possible to store the program in a memory device implemented in combination of part or all of the aforementioned media. The storage unit may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present invention by means of an external port. It may also be possible for a separate storage device installed on a communication network to attach to the device performing the methods according to embodiments of the present invention.

<Third Embodiment>

Figure 21:
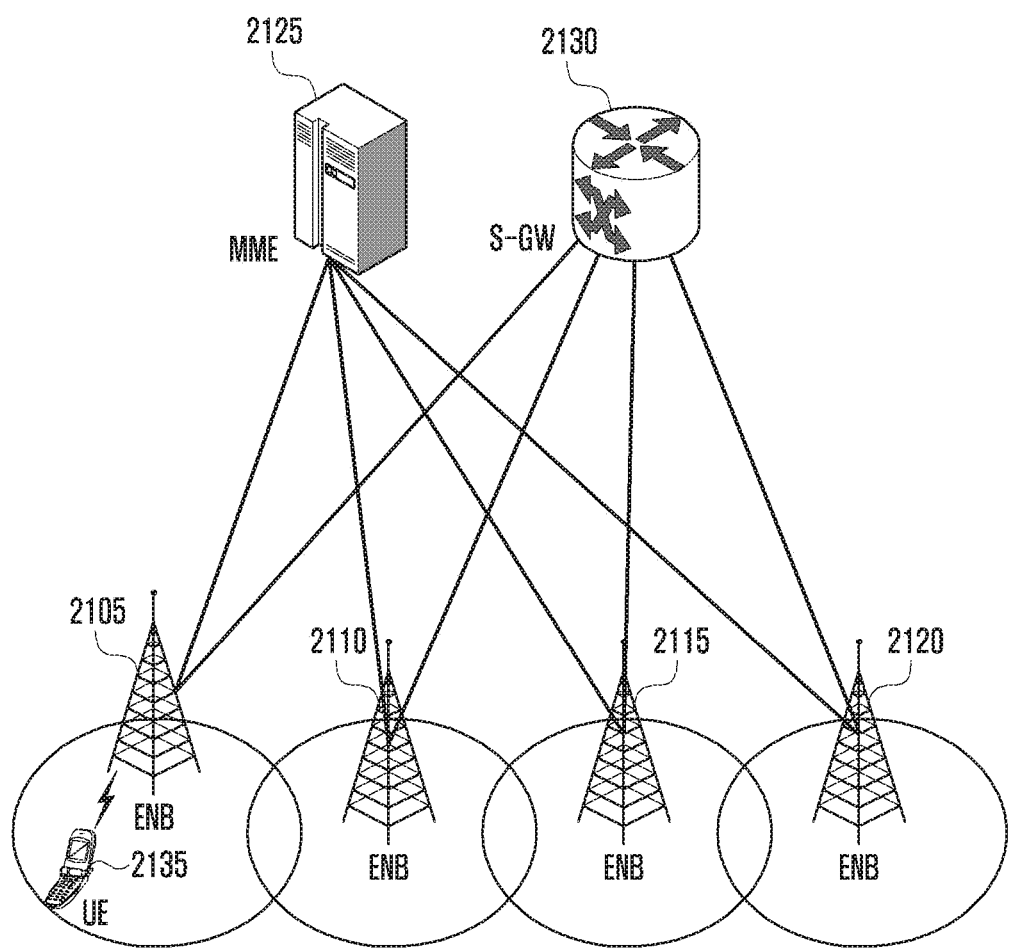
FIG. 21 is a diagram illustrating LTE system architecture to which the present invention is applied.

FIG. 21 is a diagram illustrating LTE system architecture to which the present invention is applied.

In reference to FIG. 21, a radio access network of the LTE system includes evolved Node Bs (eNBs) 2105, 2110, 2115, and 2120; a mobility management entity (MME) 2125; and a serving gateway (S-GW) 2130. The user terminal (user equipment, UE, or terminal) 2135 connects to an external network via the eNBs 2105, 2110, 2115, and 2120 and the S-GW 2130.

In FIG. 21, the eNBs 2105, 2110, 2115, and 2120 are equivalent to the legacy node Bs of the universal mobile telecommunications system (UMTS). The UE 2135 connects to one of the eNBs via a radio channel, and the eNB has more control functions than the legacy node B.

In the LTE system where all user traffic including real time services such as Voice over IP (VoIP) is served through shared channels, it is necessary to schedule UEs based on scheduling information such as buffer status, power headroom status, and channel status collected from the UEs, the eNBs 2105, 2110, 2115, and 2120 serving the UEs take charge of this function.

It is typical that one eNB hosts a plurality of cells. The LTE system adopts orthogonal frequency division multiplexing (OFDM) as a radio access technology to secure a data rate of up to 100 Mbps in a bandwidth of 20 MHz.

The LTE system also adopts Adaptive Modulation and Coding (AMC) to determine the modulation scheme and channel coding rate in adaptation to the channel condition of the UE. The S-GW 2130 as an entity handling bearers establishes and releases data bearers under the control of the MME 2125. The MME 2125 takes charge of various control functions and maintains connections with a plurality of eNBs.

Figure 22:
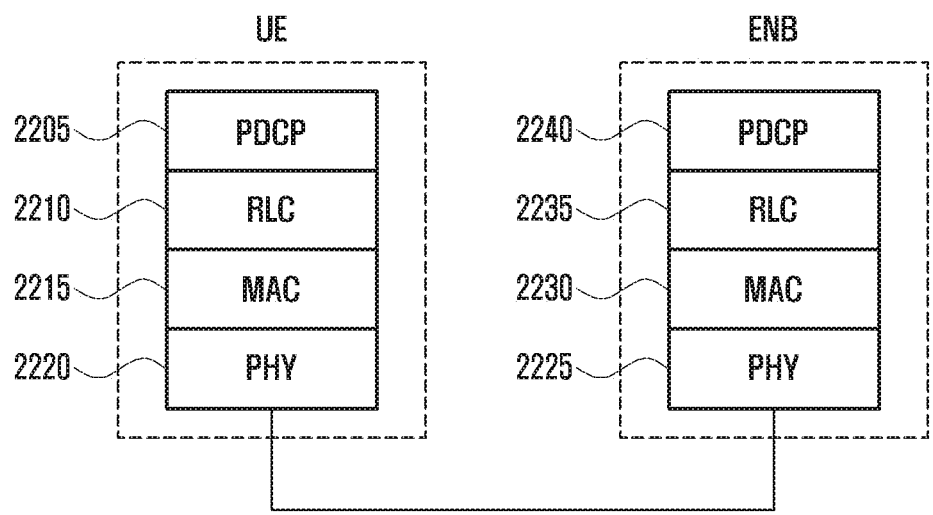
FIG. 22 is a diagram illustrating a radio protocol stack of an LTE system to which the present invention is applied.

FIG. 22 is a diagram illustrating a radio protocol stack of an LTE system to which the present invention is applied.

In reference to FIG. 22, the protocol stack of the interface between the UE and the eNB in the LTE system includes a plurality of protocol layers stacked from the bottom to the top: physical layer denoted by reference numbers 2220 and 2225, medium access control (MAC) layer denoted by reference numbers 2215 and 2230, radio link control (RLC) layer denoted by reference numbers 2210 and 2235, and packet data convergence control (PDCP) layer denoted by reference numbers 2205 and 2240. The PDCP layer denoted by reference numbers 2205 and 2240 takes charge of compressing/decompressing an IP header, and the RLC layer denoted by reference numbers 2210 and 2235 takes charge of reconfiguring a PDCP Packet Data Unit (PDU) in an appropriate size to perform Automatic Repeat request(ARQ) operation. The MAC layer denoted by reference numbers 2215 and 2230 allows for connection of multiple RLC entities established for one UE and takes charge of multiplexing RLC PDUs from the RLC layer into an MAC PDU and demultiplexing an MAC PDU into RLC PDUs.

The PHY layer denoted by reference numbers 2220 and 2225 takes charge of channel-coding and modulation on higher layer data to generate and transmit OFDM symbols over a radio channel and demodulating and channel-decoding on OFDM symbols received over the radio channel to deliver the decoded data to the higher layers.

If network congestion occurs, an LTE network restricts additional UE access using various access control functions such as access class barring (ACB) and service-specific access control (SSAC). ACB is an access control function applicable to all UEs. The network may broadcast configuration information on the classes of UEs allowed for access in association with emergency communication, signaling, and data by means of system information block 2 (SIB2). The information elements (IEs) included in the SIB2 are listed in the following table. Whether to allow access of a UE is indicated selectively for emergency communications and determined based on random variables for the signaling and data.

In the case of signaling and data, a value is arbitrarily selected in the range between 0 and 1 for the UE. The UE may compare the selected value with a value indicated by an Ac-BarringFactor IE from the network and, if the selected value is less than the value indicated by this IE, performs access to the corresponding cell. The BarringFactor IE is indicative of p00=0, p05=0.05, p10=0.10, . . . , p95=0.95. Otherwise, the UE cannot access the corresponding cell.

The UE in the access-barred state substitutes the value indicated in an ac-BarringTime IE transmitted by the network in the following equation to derive a back-off time. In the following equation, the back-off time is calculated by unit of second.

$$(0.7+0.6*\text{rand})*\text{ac-BarringTime} \quad (1)$$

The UE in the access-barred state cannot perform barring check during the calculated back-off time. After the back-off time expires, the UE can assess whether access is allowed.

In Rel-12 or later versions, the ACB may be signaled per PLMN in a cell. That is, it may be possible that different ACB configuration information is provided per PLMN.

SSAC is similar in its role to ACB. However, SSAC differs from ACB in that the access control can be performed by type of traffic such as voice and video.

The SSAC configuration information is delivered to a higher layer in the UE; thus, a higher layer entity assesses whether the UE is allowed to access for the type of traffic based on the SSAC configuration information.

```
<SystemInformationBlockType2 information element>
-- ASN1START
SystemInformationBlockType2 ::=          SEQUENCE {
    ac-BarringInfo                           SEQUENCE {
        ac-BarringForEmergency                   BOOLEAN,
        ac-BarringForMO-Signalling               AC-BarringConfig              OPTIONAL,      -- Need OP
        ac-BarringForMO-Data                     AC-BarringConfig              OPTIONAL       -- Need OP
    }                                                                          OPTIONAL,      -- Need OP
    radioResourceConfigCommon                RadioResourceConfigCommonSIB,
    ue-TimersAndConstants                    UE-TimersAndConstants,
    freqInfo                                 SEQUENCE {
        ul-CarrierFreq                           ARFCN-ValueEUTRA              OPTIONAL,      -- Need OP
        ul-Bandwidth                             ENUMERATED {n6, n15, n25, n50, n75, n100}
                                                                               OPTIONAL,      -- Need OP
        additionalSpectrumEmission               AdditionalSpectrumEmission
    },
    mbsfn-SubframeConfigList                 MBSFN-SubframeConfigList          OPTIONAL,      -- Need OR
    TimeAlignmentTimerCommon                 TimeAlignmentTimer,
    ...,
    lateNonCriticalExtension                 OCTET STRING (CONTAINING SystemInformationBlockType2-v8h0-IEs)
        OPTIONAL,
```

```
[[ ssac-BarringForMMTEL-Voice-r9        AC-BarringConfig                        OPTIONAL,       -- Need OP
   ssac-BarringForMMTEL-Video-r9        AC-BarringConfig                        OPTIONAL        -- Need OP
]],
[[ ac-BarringForCSFB-r10                AC-BarringConfig                        OPTIONAL        -- Need OP
]],
[[
   ac-BarringSkipForMMTELVoice-r12      ENUMERATED {true}                       OPTIONAL,       -- Need OP
   ac-BarringSkipForMMTELVideo-r12      ENUMERATED {true}                       OPTIONAL,       -- Need OP
   ac-BarringSkipForSMS-r12             ENUMERATED {true}                       OPTIONAL,       -- Need OP
   ac-BarringPerPLMN-List-r12           AC-BarringPerPLMN-List-r12              OPTIONAL        -- Need OP
]]
}
SystemInformationBlockType2-v8h0-IEs ::=    SEQUENCE {
   multiBandInfoList                    SEQUENCE (SIZE (1..maxMultiBands)) OF AdditionalSpectrumEmission
   OPTIONAL, -- Need OR
   nonCriticalExtension                 SystemInformationBlockType2-v9e0-IEs OPTIONAL
}
SystemInformationBlockType2 -v9e0-IEs ::= SEQUENCE {
   ul-CarrierFreq-v9e0                  ARFCN-ValueEUTRA-v9e0                   OPTIONAL,       -- Cond ul-FreqMax
   nonCriticalExtensisn                 SEQUENCE { }                            OPTIONAL
}
AC-BarringConfig ::=                    SEQUENCE {
   ac-BarringFactor                     ENUMERATED {
                                          p00, p05, p10, p15, p20, p25, p30, p40,
                                          p50, p60, p70, p75, p80, p85, p90, p95},
   ac-BarringTime                       ENUMERATED {s4, s8, s16, s32, s64, s128, s256, s512),
   ac-BarringForSpecialAC               BIT STRING (SIZE(5))
}
MBSFN-SubframeConfigList ::=            SEQUENCE (SIZE (1..maxMBSFN-Allocations)) OF MBSFN-SubframeConfig
AC-BarringPerPLMN-List-r12 ::=          SEQUENCE (SIZE (1.. maxPLMN-r11)) OF AC-BarringPerPLMN-r12
AC-BarringPerPLMN-r12 ::=               SEQUENCE {
   plmn-IdentityIndex-r12                  INTEGER {1..maxPLMN-r11},
   ac-BarringInfo-r12                      SEQUENCE {
      ac-BarringForEmergency-r12              BOOLEAN,
      ac-BarringForMO-Signalling-r12          AC-BarringConfig                  OPTIONAL,       -- NEED OP
      ac-BarringForMO-Data-r12                AC-BarringConfig                  OPTIONAL,       -- NEED OP
                                                                                OPTIONAL,       -- NEED OP
   }
   ac-BarringSkipForMMTELVoice-r12      ENUMERATED {true}                       OPTIONAL,       -- NEED OP
   ac-BarringSkipForMMTELVideo-r12      ENUMERATED {true}                       OPTIONAL,       -- NEED OP
   ac-BarringSkipForSMS-r12             ENUMERATED {true}                       OPTIONAL,       -- NEED OP
   ac-BarringForCSFB-r12                AC-BarringConfig                        OPTIONAL,       -- NEED OP
   ssac-BarringForMMTEL-Voice-r12       AC-BarringConfig                        OPTIONAL,       -- NEED OP
   ssac-BarringForMMTEL-Video-r12       AC-BarringConfig                        OPTIONAL        -- NEED OP
}
-- ASN1STOP
```

Figure 23:
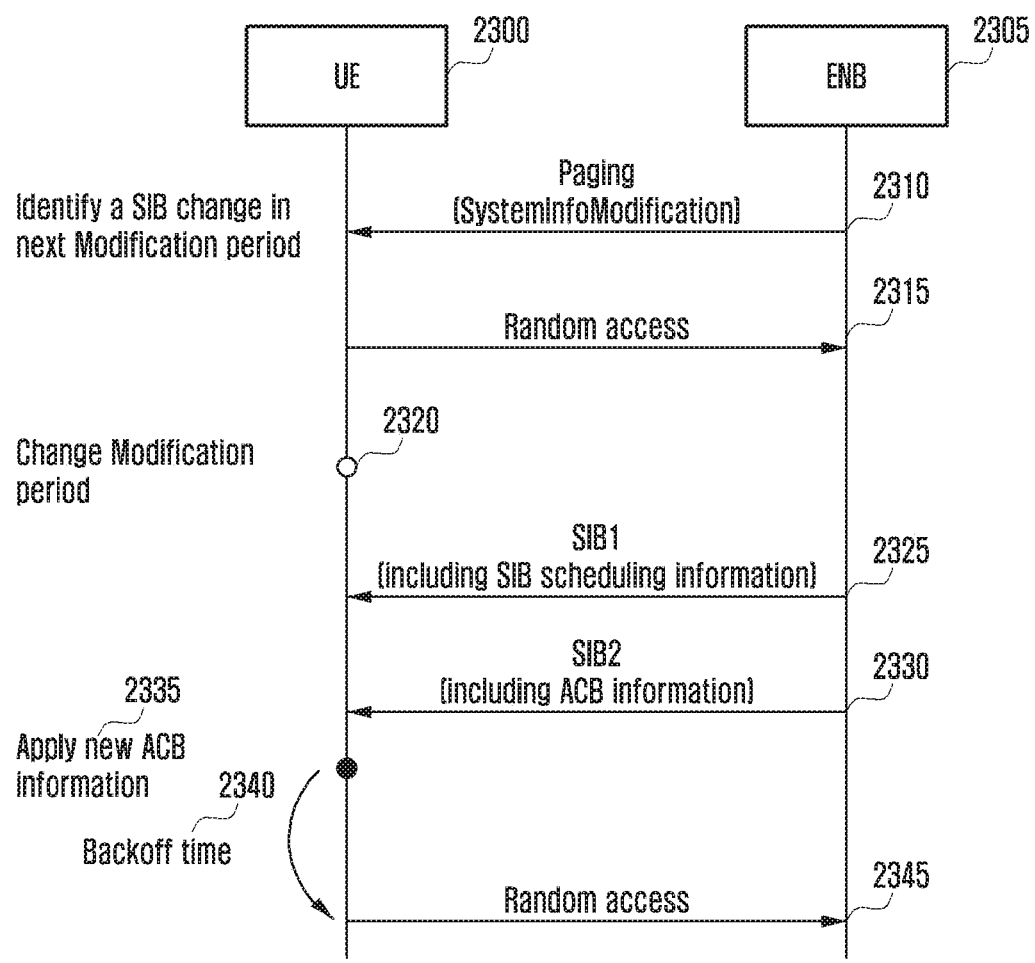
FIG. 23 is a signal flow diagram illustrating a procedure of applying ACB configuration information in the conventional technology.

FIG. 23 is a signal flow diagram illustrating a procedure of applying ACB configuration information in the conventional technology. If network congestion is detected, it may be necessary for an eNB 2305 to provide a UE 2300 with new ACB configuration information by means of SIB2.

For this purpose, it is necessary to notify the UE 2300 that system information has been changed. The eNB 2305 broadcasts a paging message including a SystemInfoModification IE for the UE 2300 at step 2310. As the modified system information should be broadcast in an SI modification period following the SI modification period during which the UE 2300 receives the paging message, the UE 2300 may attempt access to the network using the old ACB configuration information at step 2315 before the next SI modification period.

If the next SI modification period arrives at step 2320, the UE receives SIB1 at step 2325. The SIB1 includes scheduling information of other SIBs. The UE receives SIB2 including the ACB configuration information based on the scheduling information at step 2330.

Upon receipt of the ACB configuration information, the UE applies the updated ACB configuration information immediately at step 2335. If the access is triggered, the UE applies the updated ACB configuration information to determine whether the access is allowed and, if the access is barred, holds assessing whether the access is allowed during the calculated back-off time 2340. If the back-off time expires, the UE 2300 may assess whether the access is allowed and, if so, perform the random access at step 2345.

The present invention is directed to an application-specific congestion control for data communication (ACDC) as an access control function that is newly introduced in Rel-13. The ACDC is advantageous in terms of more flexible access control in comparison with the legacy ACB and SSAC. The ACDC makes it possible for the operator to perform access control by service type. For example, if a disaster occurs, it may cause significant network congestion.

In this situation, the operator may allow only applications, such as emergency call, designated by the operator to access the network using the ACDC function. It may also be possible to categorize and control the allowed applications by characteristic.

The eNB may control the RRC connection configuration of the UEs with the ACB and ACDC parameters using the system information. If it is intended to allow access from applications related to the disaster, the eNB may broadcast the system information including ACDC parameters set to a high BarringFactor for the ACDC categories allowed for access (hereinafter, referred to as ACDC category x) and a low BarringFactor for the other categories, and ACB parameters set to a low ac-BarringFactor for all access classes. The access of the UEs with no ACDC category is barred by applying ACB; the access of the UEs with an ACDC category is determined on whether the UE has the ACDC category x by applying ACDC rather than ACB.

A serving cell may be shared by multiple PLMNs, and the operator may want to apply the ACDC parameters to specific PLMNs.

The ACDC parameters may include PLMN information indicating PLMNs to which the ACDC is applied.

<Exemplary ACDC Parameters>
AcdcBarringInfo
   AcdcPLMNList BIT STRING (SIZE(maxPLMN))
   AcdcCategoryBarringInfoList SEQUENCE (SIZE (1. . maxAcdcCategory)) OF acdcCategory-BarringInfo
<Example of acdcCategoy-BarringInfo>
acdcCategoryIndex
BarringFactor ENUMERATED {p00, p05, p10, p15, p20, p25, p30, p40, p50, p60, p70,
p75, p80, p85, p90, p95},
ac-BarringTime ENUMERATED {s4, s8, s16, s32, s64, s128, s256, s512}

Here, AcdcPLMNList denotes a PLMN information bitmap to which ACDC barring information is mapped. The PLMNs being supported in a cell may be mapped to the bitmap in such a way that the first bit corresponds to the first PLMN in the plmn-IdentityList contained in the SIB1.

The UE makes an access barring determination by applying one of the ACB and ACDC parameters in the system that broadcasts both the ACB and ACDC parameters. The UE selects one of the two parameters by referencing the PLMN list broadcast by means of SIBx.

If the PLMN list includes the home PLMN (HPLMN) of the UE, a registered PLMN (RPLMN), or a selected PLMN, the UE determines to make the access barring determination with the ACDC parameter; otherwise, the UE determines to make the access barring determination with the ACB parameter.

If SIBx includes the ACDC parameter but not a PLMN list, it is determined that the ACDC parameter is applied to the PLMN fulfilling a predetermined condition. For example, the PLMN fulfilling the predetermined condition may be the first PLMN among the PLMNs listed in the PLMN list conveyed in SIB1. It may also be possible that all PLMNs listed in the PLMN list conveyed in SIB1 fulfill the predetermined condition.

Figure 24:
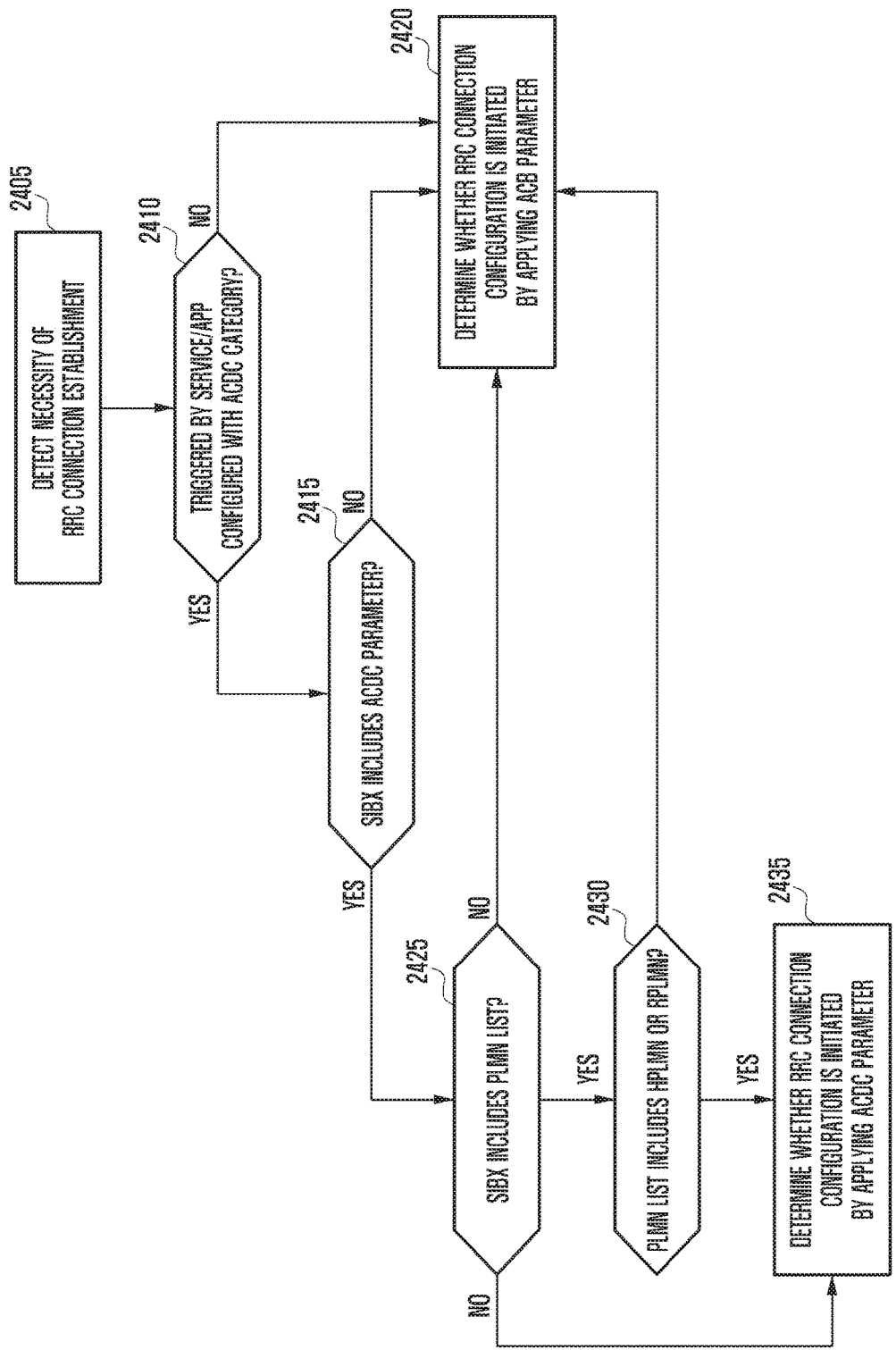
FIG. 24 is a flowchart illustrating an operation of a UE according to an embodiment of the present invention.

FIG. 24 is a flowchart illustrating an operation of a UE according to an embodiment of the present invention. In the following description, a service triggering an RRC connection establishment is referred to as SERVICE_RRC, and an ACDC category designated to the SERVICE_RRC is referred to as CAT_SERVICE_RRC.

A UE detects a necessity of RRC connection establishment at step 2405. The UE determines whether the RRC connection establishment necessity is caused by a service with an ACDC category at step 2410 and, if so, the procedure goes to step 2415; if not, the procedure goes to step 2420.

At step 2415, the UE determines whether the most recently-received valid SIBx includes an ACDC parameter. If there is no valid SIBx, the UE receives SIBx and determines whether the SIBx includes an ACDC parameter. If the SIBx includes an ACDC parameter, the procedure goes to step 2425; if the SIBx includes no ACDC parameter, the procedure goes to step 2420.

At step 2425, the UE determines whether the SIBx includes access control information on CAT_SERVICE_RRC and, if so, the procedure goes to step 2430; if not, the procedure goes to step 2420.

At step 2430, the UE determines whether the ACDC information of SIBx includes a PLMN list and, if so, the procedure goes to step 2435 in which the UE determines whether the access is allowed by applying the barringFactor indicated by the CAT_SERVICE_RRC and, if so, initiates an RRC connection establishment procedure. The UE generates a random value in the range between 0 and 1 and, if the random value is less than a real number indicated by the barringFactor in the range of 0 and 1, determines that access is allowed; if the random value is not less than the real number indicated by the barringFactor, the UE determines that access is barred. P00 corresponds to 0, p05 corresponds to 0.05, and p95 corresponds to 0.95. At step 2420, the UE determines whether access is allowed by applying the ACB parameter; for more details of the procedure, see section 5.3.3.11 of TS 36.331.

Figure 25:
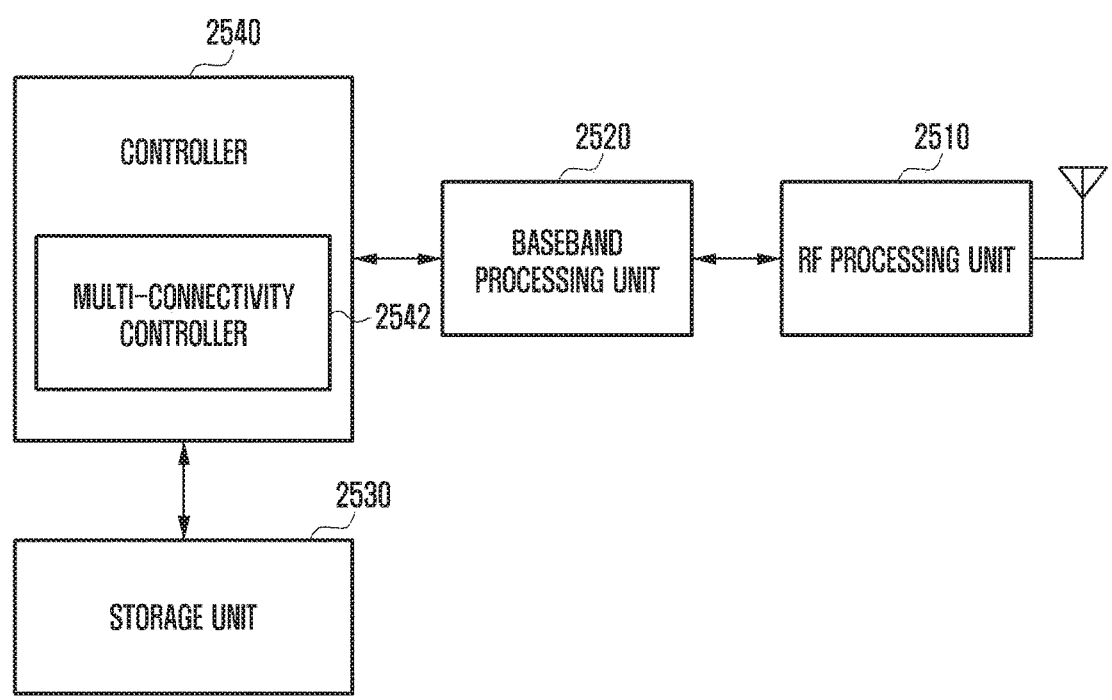
FIG. 25 is a block diagram illustrating a configuration of a UE in a wireless communication system according to an embodiment of the present invention.

FIG. 25 is a block diagram illustrating a configuration of a UE in a wireless communication system according to an embodiment of the present invention.

In reference to FIG. 25, the UE includes a radio frequency (RF) processing unit 2510, a baseband processing unit 2520, a storage unit 2530, and a controller 2540.

The RF processing unit 2510 takes charge of signal band conversion and amplification for transmitting signals over a radio channel. That is, the RF processing unit 2510 up-converts a baseband signal output from the baseband processing unit 2520 to an RF band signal for transmission through antennas and down-converts an RF band signal received through the antennas to a baseband signal. For example, the RF processing unit 2510 may include a transmission filter, a reception filter, an amplifier, a mixer, an oscillator, a digital-to-analog converter (DAC), and an analog-to-digital convertor (ADC). Although one antenna is depicted in FIG. 25, the UE may include a plurality of antennas. The RF processing unit 2510 may include a plurality of RF chains. The RF processing unit 2510 may perform beamforming. For beamforming, the RF processing unit 2510 may adjust the phases and sizes of the signal transmitted/received through the antennas or antenna elements.

The baseband processing unit 2520 takes charge of conversion between baseband signals and bit strings according to a physical layer protocol of the system. For example, the baseband processing unit 2520 performs encoding and modulation on the transmit bit strings to generate complex symbols in data transmission mode. The baseband processing unit 2520 also performs demodulation and decoding on the baseband signal from the RF processing unit 2510 to recover the received bit strings in data reception mode. For the case of an orthogonal Frequency Division Multiplexing (OFDM) system, the baseband processing unit 2520 performs encoding and modulation on the transmit bit string to generate complex symbols, maps the complex symbols to subcarriers, performs inverse fast Fourier transform (IFFT) on the subcarriers, and inserts a cyclic prefix (CP) to generate OFDM symbols in the data transmit mode. The baseband processing unit 2520 splits the baseband signal from the RF processing unit 2510 into OFDM symbols, recovers the signals mapped to the subcarriers through fast Fourier transform (FFT), and performs demodulation and decoding to recover the bit strings in the data reception mode.

The baseband processing unit 2520 and the RF processing unit 2510 take charge of transmitting and receiving signals as described above. Accordingly, the baseband processing unit 2520 and the RF processing unit 2510 may be referred to as a transmission unit, a reception unit, a transceiver, or a communication unit. At least one of the baseband processing unit 2520 and the RF processing unit 2510 may include a plurality of communication modules for supporting different radio access technologies. At least one of the baseband processing unit 2520 and the RF processing unit 2510 may include a plurality of communication modules for processing different frequency band signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz).

The storage unit 2530 stores basic programs for operation of the UE, application programs, and data such as configuration information. In particular, the storage unit 2530 may store the information related to the secondary access node with which the UE performs radio communication using the secondary radio access technology.

The storage unit 2530 provides the stored data in response to a request from the controller 2540.

The controller 2540 controls overall operations of the UE. For example, the controller 2540 controls the baseband processing unit 2520 and the RF processing unit 2510 to transmit/receive signals. The controller 2540 also writes and reads data to and from the storage unit 2530. In order to accomplish this, the controller 2540 may include at least one processor. For example, the controller may include a communication processor (CP) for controlling communication and an application processor (AP) for controlling higher layers such as application programs. According to an embodiment of the present invention, the controller 2540 may control the UE to perform the operations and procedures described with reference to FIG. 24.

Figure 26:
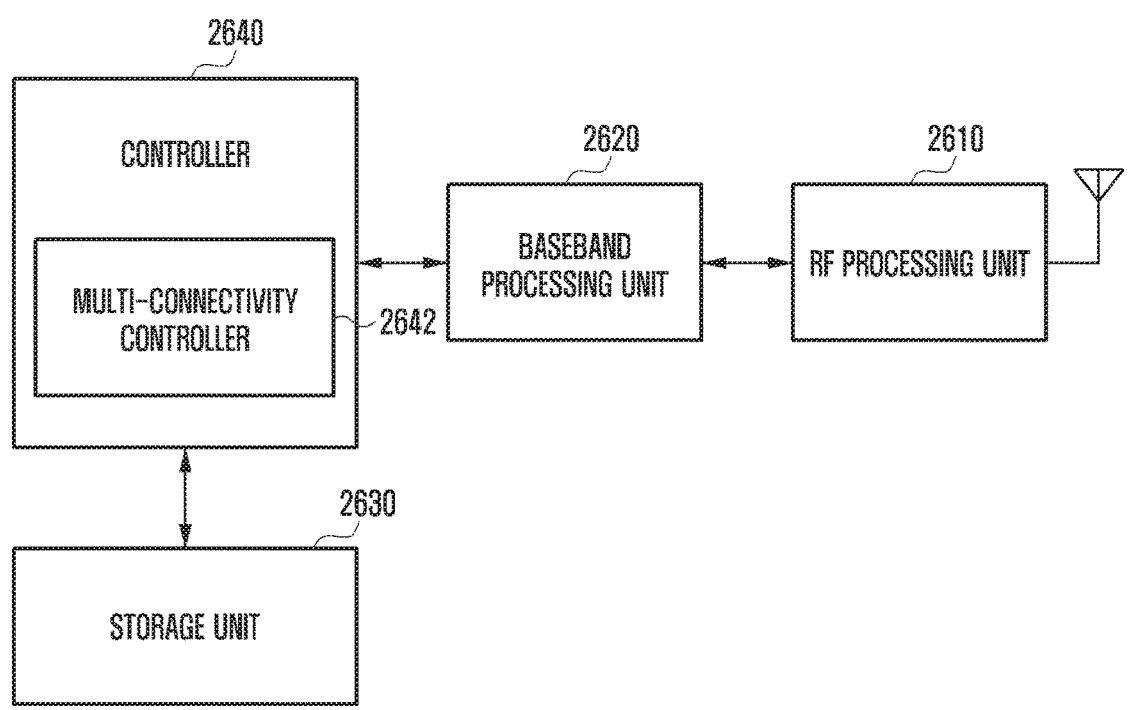
FIG. 26 is a block diagram illustrating a configuration of a primary eNB in a wireless communication system according to an embodiment of the present invention.

FIG. 26 is a block diagram illustrating a configuration of a primary eNB in a wireless communication system according to an embodiment of the present invention. As shown in FIG. 26, the eNB includes an RF processing unit 2610, a baseband processing unit 2620, a backhaul communication unit 2630, a storage unit 2640, and a controller 2650.

The RF processing unit 2610 takes charge of signal band conversion and amplification for transmitting signals over a radio channel. That is, the RF processing unit 2610 up-converts a baseband signal output from the baseband processing unit 2620 to an RF band signal for transmission through antennas and down-converts an RF band signal received through the antennas to a baseband signal.

For example, the RF processing unit 2610 may include a transmission filter, a reception filter, an amplifier, a mixer, an oscillator, a DAC, and an ADC. Although one antenna is depicted in FIG. 26, the primary eNB may include a plurality of antennas. The RF processing unit 2610 may include a plurality of RF chains. The RF processing unit 2610 may perform beamforming. For beamforming, the RF processing unit 2610 may adjust the phases and sizes of the signal transmitted/received through the antennas or antenna elements.

The baseband processing unit 2620 takes charge of conversion between baseband signals and bit strings according to a physical layer protocol of the system. For example, the baseband processing unit 2620 performs encoding and modulation on the transmit bit strings to generate complex symbols in data transmission mode. The baseband processing unit 2620 also performs demodulation and decoding on the baseband signal from the RF processing unit 2610 to recover the received bit strings in data reception mode. For the case of an OFDM system, the baseband processing unit 2620 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 2620 splits the baseband signal from the RF processing unit 2610 into OFDM symbols, recovers the signals mapped to the subcarriers through FFT, and performs demodulation and decoding to recover the bit strings in the data reception mode. The baseband processing unit 2620 and the RF processing unit 2610 take charge of transmitting and receiving signals as described above. Accordingly, the baseband processing unit 2620 and the RF processing unit 2610 may be referred to as a transmission unit, a reception unit, a transceiver, or a communication unit.

The backhaul communication unit 2630 provides an interface for communication with other network nodes. That is, the backhaul communication unit 2630 converts the bit string to be transmitted from the primary eNB to the secondary eNB and core network to a physical signal and the physical signal received from another node to a bit string.

The storage unit 2640 stores basic programs for operation of the primary eNB, application programs, and data such as configuration information. In particular, the storage unit 2640 may store the information on the bearers allocated to the connected UE and measurement results reported by the UE.

The storage unit 2640 may also store the information as criteria for determining whether to enable or disable multi-connectivity for the UE.

The storage unit 2640 provides the stored data in response to a request from the controller 2650.

The controller 2650 may control overall operations of the primary eNB. For example, the controller 2650 controls the baseband processing unit 2620, the RF processing unit 2610, and the backhaul communication unit 2630 for transmitting/receiving signals. The controller 2650 also writes and reads data to and from the storage unit 2640. In order to accomplish this, the controller 2640 may include at least one processor. According to an embodiment of the present invention, the controller 2650 includes a multi-connectivity controller 2652. For example, the controller 2650 may control the primary eNB to perform the operations and procedure described with reference to FIG. 24.

The invention claimed is:

1. A communication method by a user equipment (UE) in a wireless communication system, the method comprising:
   receiving, from a base station, system information including information on a public land mobile network (PLMN), application specific congestion control for data communication (ACDC) configuration information, and an ACDC parameter, wherein the ACDC configuration information indicates whether the ACDC parameter is applicable only for a UE in a home PLMN (HPLMN) of the UE for the PLMN, and the ACDC parameter is associated with barring an access from the UE to the base station for the PLMN;
   determining whether the UE is allowed to gain access to the base station based on the ACDC configuration information for the PLMN and the ACDC parameter for the PLMN; and establishing a radio resource control (RRC) connection with the base station based on the determination that the UE is allowed to gain access to the base station.

2. The method of claim 1, wherein the ACDC parameter comprises ACDC-related barring information, the ACDC-related barring information comprises at least one of a barring factor for determining whether to allow access and a barring time being applied when access is barred.

3. The method of claim 1, wherein the system information is SystemInformationBlockType2.

4. A communication method by a base station in a wireless communication system, the method comprising:
- generating information on a public land mobile network (PLMN), application specific congestion control for data communication (ACDC) configuration information, and an ACDC parameter, wherein the ACDC configuration information indicates whether the ACDC parameter is applicable only for a user equipment (UE) in a home public land mobile network (HPLMN) of the UE for the PLMN and the ACDC parameter is associated with barring an access from the UE to the base station for the PLMN; and
- broadcasting system information including the information on the PLMN, the ACDC configuration information, and the ACDC parameter,
- wherein access of the UE to the base station is allowed to based on the ACDC configuration information for the PLMN and the ACDC parameter for the PLMN.

5. The method of claim 4, wherein the ACDC parameter comprises ACDC-related barring information, the ACDC-related barring information comprising at least one of a barring factor for determining whether to allow access and a barring time being applied when access is barred.

6. The method of claim 4, wherein the system information is SystemInformationBlockType2.

7. A user equipment (UE) in a mobile communication system, the UE comprising:
- a transceiver; and
- a controller coupled with the transceiver and configured to control to:
  - receive, from a base station, system information including information on a public land mobile network (PLMN), application specific congestion control for data communication (ACDC) configuration information, and an ACDC parameter, wherein the ACDC configuration information indicates whether the ACDC parameter is applicable only for a UE in a home public land mobile network (HPLMN) of the UE for the PLMN and the ACDC parameter is associated with barring an access from the UE to the base station for the PLMN,
  - determine whether the UE is allowed to gain access to the base station based on the ACDC configuration information for the PLMN and the ACDC parameter for the PLMN, and
  - establish a radio resource control (RRC) connection with the base station based on the determination that the UE is allowed to gain access to the base station.

8. The UE of claim 7, wherein the ACDC parameter comprises ACDC-related barring information, the ACDC-related barring information comprises at least one of a barring factor for determining whether to allow access and a barring time being applied when access is barred.

9. The UE of claim 7, wherein the system information is SystemInformationBlockType2.

10. A base station in a mobile communication system, the base station comprising:
- a transceiver; and
- a controller coupled with the transceiver and configured to control to:
  - generate information on a public land mobile network (PLMN), application specific congestion control for data communication (ACDC) configuration information, and an ACDC parameter, wherein the ACDC configuration information indicates whether the ACDC parameter is applicable only for a user equipment (UE) in a home public land mobile network (HPLMN) of the UE for the PLMN and the ACDC parameter is associated with barring an access from the UE to the base station for the PLMN, and
  - broadcast system information including the information on the PLMN, the ACDC configuration information, and the ACDC parameter,
- wherein access of the UE to the base station is allowed to based on the ACDC configuration information the information on the PLMN and the ACDC parameter the information on the PLMN.

11. The base station of claim 10, wherein the ACDC parameter comprises ACDC-related barring information, the ACDC-related barring information comprising at least one of a barring factor for determining whether to allow access and a barring time being applied when access is barred.

* * * * *